US008096872B2

(12) United States Patent
Walker et al.

(10) Patent No.: US 8,096,872 B2
(45) **Date of Patent: *Jan. 17, 2012**

(54) METHOD AND APPARATUS FOR PROVIDING ELECTRONIC CREDITS AT A GAMING DEVICE WITHOUT FIRST REQUIRING PAYMENT THEREFOR

(75) Inventors: Jay S. Walker, Ridgefield, CT (US); James A. Jorasch, Stamford, CT (US); Dean P. Alderucci, Westport, CT (US); Magdalena M Fincham, Ridgefield, CT (US); Keith Bemer, Brooklyn, NY (US); Daniel E. Tedesco, Huntington, CT (US); Geoffrey M. Gelman, Stamford, CT (US); Stephen C. Tulley, Fairfield, CT (US)

(73) Assignee: IGT, Reno, NV (US)

( * ) Notice: Subject to any disclaimer, the term of this patent is extended or adjusted under 35 U.S.C. 154(b) by 1630 days.

This patent is subject to a terminal disclaimer.

(21) Appl. No.: 10/852,388

(22) Filed: May 24, 2004

(65) Prior Publication Data

US 2005/0187012 A1 Aug. 25, 2005

Related U.S. Application Data

(63) Continuation-in-part of application No. 10/729,439, filed on Dec. 5, 2003, now Pat. No. 7,892,090, which is a continuation of application No. 09/716,192, filed on Nov. 17, 2000, now Pat. No. 6,682,422, which is a continuation of application No. 09/102,403, filed on Jun. 22, 1998, now Pat. No. 6,190,256.

(60) Provisional application No. 60/475,150, filed on Jun. 2, 2003.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................... 463/25; 463/26; 463/29

(58) Field of Classification Search ........................ None
See application file for complete search history.

(56) References Cited

U.S. PATENT DOCUMENTS 4,669,731 A * 6/1987 Clarke ........................... 463/20

(Continued)

OTHER PUBLICATIONS

Parets, Robyn Taylor, "Cash Advances", International Gaming and Wagering Business, Sep. 1996, Section: p. S8, ISSN: 8750-8222.

(Continued)

*Primary Examiner* — Dmitry Suhol
*Assistant Examiner* — Kevin Y Kim
(74) *Attorney, Agent, or Firm* — K&L Gates LLP

(57) ABSTRACT

In accordance with some embodiments, apparatus and methods are disclosed for providing electronic credits to a player of a gaming device. The electronic credits are provided in response to an occurrence of an event other than an outcome of a game play. Further, the electronic credits are provided without requiring the player to first provide payment therefore. In some, the number of electronic credits may be determined based on information associated with at least one of the player, the gaming device, and a casino associated with the gaming device. In some embodiments, the an offer for the electronic credits is output to the player at the gaming device and the electronic credits are added to a credit meter balance of the gaming device upon the player's acceptance of the offer. In some embodiments, the player is required to provide a payment for the electronic credits at a time subsequent to the time at which the electronic credits are provided to the player.

39 Claims, 14 Drawing Sheets

700

| OFFER IDENTIFIER 905 | OFFER CONTENT 910 | 1ST OFFER TERM 915 | Nth OFFER TERM 920 |
|---|---|---|---|
| OF-001 | "SHORT ON CASH? PRESS THE 'QUICK LOAN' BUTTON BELOW..." | $10 LOAN AT 5% ANNUAL INTEREST | REPAYMENT DUE AT TIME OF CHECKOUT |
| OF-002 | "LOOKS LIKE YOU'RE HAVING A RUN OF BAD LUCK. PRESS THE ACCEPT BUTTON BELOW..." | $25 LOAN, 0% INTEREST | $25 REPAYMENT DUE WITHIN 24 HOURS |
| OF-003 | "AS A CONVENIENCE FOR OUR HOTEL GUESTS, THIS MACHINE IS EQUIPPED..." | $15 LOAN, 0% INTEREST | FIRST $15 NET WINNINGS DOCKED |
| OF-004 | "EARN CASH FOR YOUR UNUSED COMP POINTS! PRESS THE 'HELP' BUTTON TO..." | $20 LOAN, 0% INTEREST | $20 REPAYMENT DUE WITHIN 7 DAYS |
| OF-005 | "WANT TO KEEP PLAYING? WE'LL LOAN YOU $20 TO KEEP PLAYING AT THIS MACHINE..." | $20 LOAN, 0% INTEREST | MUST BE USED AT CURRENT GAMING DEVICE |

U.S. PATENT DOCUMENTS

| | | | | | |
|---|---|---|---|---|---|
| 4,799,683 | A | * | 1/1989 | Bruner, Jr. | 463/31 |
| 4,815,741 | A | * | 3/1989 | Small | 463/17 |
| 4,837,422 | A | * | 6/1989 | Dethloff et al. | 235/380 |
| 5,038,022 | A | | 8/1991 | Lucero | 235/380 |
| 5,265,874 | A | | 11/1993 | Dickinson et al. | 273/138 |
| 5,326,104 | A | | 7/1994 | Pease et al. | 273/138 |
| 5,429,361 | A | * | 7/1995 | Raven et al. | 463/25 |
| 5,457,306 | A | | 10/1995 | Lucero | 235/380 |
| 5,458,333 | A | | 10/1995 | Takemoto et al. | 273/138 |
| 5,470,079 | A | * | 11/1995 | LeStrange et al. | 463/25 |
| 5,476,259 | A | | 12/1995 | Weingardt | 273/85 CP |
| 5,513,102 | A | * | 4/1996 | Auriemma | 705/14.14 |
| 5,577,959 | A | | 11/1996 | Takemoto et al. | 463/25 |
| 5,655,961 | A | * | 8/1997 | Acres et al. | 463/27 |
| 5,715,924 | A | * | 2/1998 | Takemoto et al. | 194/206 |
| 5,766,075 | A | * | 6/1998 | Cook et al. | 463/25 |
| 5,816,918 | A | * | 10/1998 | Kelly et al. | 463/16 |
| 5,919,091 | A | | 7/1999 | Bell et al. | |
| 5,967,896 | A | * | 10/1999 | Jorasch et al. | 463/25 |
| 6,019,283 | A | | 2/2000 | Lucero | 235/380 |
| 6,048,269 | A | * | 4/2000 | Burns et al. | 463/25 |
| 6,110,041 | A | * | 8/2000 | Walker et al. | 463/20 |
| 6,186,893 | B1 | * | 2/2001 | Walker et al. | 463/20 |
| 6,190,256 | B1 | * | 2/2001 | Walker et al. | 463/25 |
| 6,227,972 | B1 | * | 5/2001 | Walker et al. | 463/25 |
| 6,238,288 | B1 | * | 5/2001 | Walker et al. | 463/26 |
| 6,247,643 | B1 | | 6/2001 | Lucero | 235/380 |
| 6,319,122 | B1 | * | 11/2001 | Packes et al. | 463/16 |
| 6,319,125 | B1 | | 11/2001 | Acres | |
| 6,347,738 | B1 | | 2/2002 | Crevelt et al. | 235/380 |
| 6,431,983 | B2 | | 8/2002 | Acres | 463/25 |
| 6,504,483 | B1 | | 1/2003 | Richards et al. | |
| 6,511,377 | B1 | * | 1/2003 | Weiss | 463/25 |
| 6,682,422 | B1 | * | 1/2004 | Walker et al. | 463/25 |
| 7,685,061 | B2 | | 3/2010 | Haworth et al. | |
| 2002/0068624 | A1 | | 6/2002 | Ellis | |
| 2003/0006931 | A1 | | 1/2003 | Mages | |

OTHER PUBLICATIONS

Moran, John M., "Future Currency to Take the Shape of Bits Instead of Bills", The Hartford Courant, Oct. 13, 1996, Section: Main p. A1.
Flaum, David, "Gaming—Harrah's Part of In-Flight Gambling Company", The Commercial Appeal (Memphis, TN), Sep. 13, 1998, Section: Business, p. C1.
"Manufacturer touts credit card gaming", Las Vegas Business Press, Aug. 20, 2001, Section: vol. 18, No. 32, p. 8, ISSN: 1071-2186.
"Now you can gamble with your credit cards!", Ethnic News Watch, Tri-State Defender, Aug. 22, 2001, Section: vol. 50, No. 33, p. 5B.
Office Action dated Aug. 1, 2011, for U.S. Appl. No. 12/511,268 (14 pages).

* cited by examiner

400

| RANDOM NUMBER 410 | OUTCOME 420 |
|---|---|
| 00001 | 7 / 7 / 7 |
| 00002 | NON-WINNING |
| 00003 | ANY / ANY / CHERRY |
| 00004 | NON-WINNING |
| 00005 | NON-WINNING |
| 00006 | ANY / ANY / CHERRY |
| ⋮ | ⋮ |
| 00112 | BAR / BAR / BAR |
| 00113 | NON-WINNING |
| 00114 | ANY / ANY / CHERRY |
| 00115 | NON-WINNING |
| 00116 | NON-WINNING |
| 00117 | BAR / PLUM / PLUM |
| ⋮ | ⋮ |
| 03456 | BELL / BELL / BELL |
| 03457 | ANY / ANY / CHERRY |
| 03458 | NON-WINNING |
| 03459 | NON-WINNING |
| ⋮ | ⋮ |
| 10647 | ORANGE / ORANGE / ORANGE |
| 10648 | ORANGE / ORANGE / BAR |

PRIOR ART

FIG. 4

500

| OUTCOME 505 | PAYOUT 510 |
|---|---|
| CHERRY / ANY / ANY | 2 |
| ANY / ANY / CHERRY | 2 |
| CHERRY / CHERRY / ANY | 5 |
| ANY / CHERRY / CHERRY | 5 |
| CHERRY / ANY / CHERRY | 5 |
| CHERRY / CHERRY / CHERRY | 20 |
| BAR / ORANGE / ORANGE | 10 |
| ORANGE / ORANGE / BAR | 10 |
| ORANGE / ORANGE / ORANGE | 20 |
| BAR / PLUM / PLUM | 14 |
| PLUM / PLUM / BAR | 14 |
| PLUM / PLUM / PLUM | 20 |
| BAR / BELL / BELL | 18 |
| BELL / BELL / BAR | 18 |
| BELL / BELL / BELL | 20 |
| BAR / BAR / BAR | 50 |
| 7 / 7 / 7 | 100 |

R500-20

R500-05

R500-10

PRIOR ART

FIG. 5

600

| PLAYER IDENTIFIER 610 | NAME 620 | FINANCIAL ACCOUNT IDENTIFIER 630 | COMP POINTS 640 | THEORETICAL WIN / (LOSS) 650 | |
|---|---|---|---|---|---|
| 1270319 | BOB SMITH | ACCT 99 003 | 4,683 | $3,512 | |
| 11285739 | JIM RED | 5424 5555<br>8910 3218<br>VISA - 03/2005 | 376 | $282 | |
| 41298800 | JOE GREEN | 99 818 5555 | 17,069 | $12,802 | |
| 25647810 | MARY BROWN | ACCT 23 1564 | 2,321 | $9,802 | |

FIG. 6A 600 (CONT.)

| | ACTUAL WIN / (LOSS) 660 | PAYMENT AMOUNT OWED 670 | LOAN IDENTIFIER(S) 680 | PLAYER RATING 690 |
|---|---|---|---|---|
| | $4,209 | $20.00 | L-1023-4 | A |
| | ($87) | $5.00 | L-6780-1; L-9856-4 | B |
| | $10,090 | $100.00 | L-9184-5; L-0321-0; L-9192-4 | D |
| | $8,060 | $0.00 | L-9739-1; L-4218-9; L-9031-2; L-2142-9 | A |

FIG. 6B

700

| GAMING SESSION IDENTIFIER 705 | GAMING DEVICE IDENTIFIER 710 | DATE 715 | START TIME 720 |
|---|---|---|---|
| SES-4522726 | GD-10097 | 03/31/03 | 21:45 |
| SES-4522879 | GD-10098 | 03/31/03 | 23:03 |
| SES-4521304 | GD-10099 | 03/31/03 | 04:43 |
| SES-4520366 | GD-10020 | 03/31/03 | 01:13 |

700 (CONT.)

| STOP TIME 725 | PLAYER IDENTIFIER 730 | GAME IDENTIFIER 735 | COIN-IN 740 | THEORETICAL WIN / (LOSS) 745 |
|---|---|---|---|---|
| 23:00 | PL-34756 | 5-REEL, $0.25 SLOT MACHINE | $1,116 | $58 |
| 23:48 | PL-28324 | $1.00 DEUCES WILD VIDEO POKER | $1,938 | $92 |
| 07:21 | PL-00045 | 5-REEL, $0.25 SLOT MACHINE | $2,526 | $132 |
| 03:16 | PL-65432 | 5-REEL, $0.05 SLOT MACHINE | $583 | $47 |

FIG. 7

800

| RULE IDENTIFIER 805 | RULE 810 | OFFER IDENTIFIER 815 |
|---|---|---|
| R-001 | TOTAL AMOUNT WAGERED OVER PAST 6 MONTHS EXCEEDS $2,000 | OF-001 |
| R-002 | CREDIT SCORE FROM EQUIFAX IS 1 OR 2, OR PLAYER RATING IS A OR B | OF-002 |
| R-003 | $100.00 OF CREDIT IS AVAILABLE ON CREDIT CARD | OF-003 |
| R-004 | PLAYER HAS ACCEPTED AND REPAID 3 OR MORE LOAN OFFERS IN PAST 6 MONTHS | OF-004 |
| R-005 | PLAYER ACTUATES CASHOUT BUTTON AND PLAYER RATING IS A OR B | OF-004 |
| R-006 | WAGER OF PLAYER, IF LOST, WILL RESULT IN INSUFFICIENT CREDIT METER BALANCE FOR ADDITIONAL WAGERS | OF-002 |
| R-007 | CREDIT METER BALANCE IS ZERO AND PAYMENT AMOUNT OWED BY PLAYER IS < $20 | OF-005 |
| R-008 | ONE HOUR PASSED SINCE LAST OFFER | OF-006 |

FIG. 8

700

| OFFER IDENTIFIER 905 | OFFER CONTENT 910 | 1ST OFFER TERM 915 | Nth OFFER TERM 920 |
|---|---|---|---|
| OF-001 | "SHORT ON CASH? PRESS THE 'QUICK LOAN' BUTTON BELOW..." | $10 LOAN AT 5% ANNUAL INTEREST | REPAYMENT DUE AT TIME OF CHECKOUT |
| OF-002 | "LOOKS LIKE YOU'RE HAVING A RUN OF BAD LUCK. PRESS THE ACCEPT BUTTON BELOW..." | $25 LOAN, 0% INTEREST | $25 REPAYMENT DUE WITHIN 24 HOURS |
| OF-003 | "AS A CONVENIENCE FOR OUR HOTEL GUESTS, THIS MACHINE IS EQUIPPED..." | $15 LOAN, 0% INTEREST | FIRST $15 NET WINNINGS DOCKED |
| OF-004 | "EARN CASH FOR YOUR UNUSED COMP POINTS! PRESS THE 'HELP' BUTTON TO..." | $20 LOAN, 0% INTEREST | $20 REPAYMENT DUE WITHIN 7 DAYS |
| OF-005 | "WANT TO KEEP PLAYING? WE'LL LOAN YOU $20 TO KEEP PLAYING AT THIS MACHINE..." | $20 LOAN, 0% INTEREST | MUST BE USED AT CURRENT GAMING DEVICE |

FIG. 9

1000

| LOAN IDENTIFIER 1005 | OFFER IDENTIFIER 1010 | LOAN TERM(S) 1015 | TIME OUTPUT 1020 | TIME ACCEPTED 1025 | TIME REPAID 1030 | OUTSTANDING LOAN AMOUNT 1035 |
|---|---|---|---|---|---|---|
| L-9184-5 | OF-002 | 0% INTEREST, PAYMENT DUE WITHIN 24 HOURS | 5/21/04 9:18 PM | 5/21/04 9:18 PM | PENDING | $25.00 |
| L-0321-0 | OF-002 | 0% INTEREST, PAYMENT DUE WITHIN 24 HOURS | 5/20/04 11:12 PM | 5/20/04 11:12 PM | PENDING | $25.00 |
| L-9192-4 | OF-007 | PAYMENT DUE WITHIN 1 WEEK OR CREDIT CARD CHARGED | 5/18/04 5:02 AM | 5/18/04 7:09 AM | $25 REPAID 5/18/04 8:22 AM | $50.00 |
| L-6780-1 | OF-009 | PAYMENT DUE AT HOTEL CHECKOUT | 5/17/04 3:12 PM | 5/17/04 3:13 PM | $5 REPAID 5/17/04 4:02 PM | $5.00 |

FIG. 10

METHOD AND APPARATUS FOR PROVIDING ELECTRONIC CREDITS AT A GAMING DEVICE WITHOUT FIRST REQUIRING PAYMENT THEREFOR

The present application claims the benefit of commonly-owned, co-pending U.S. Provisional Application No. 60/475,150, filed Jun. 2, 2003 in the name of Walker et al. and entitled METHOD AND APPARATUS FOR PROVIDING TEMPORARY CREDIT AT A GAMING DEVICE.

The present application is also a continuation-in-part of commonly-owned, U.S. application Ser. No. 10/729,439, filed Dec. 5, 2003 in the name of Walker et al. and entitled GAMING DEVICE AND METHOD OF OPERATION THEREOF; which issued Feb. 22, 2011 as U.S. Pat. No. 7,892,090;

which is a continuation of U.S. application Ser. No. 09/716,192, filed Nov. 17, 2000 in the name of Walker et al. and entitled GAMING DEVICE AND METHOD OF OPERATION THEREOF, which issued Jan. 27, 2004 as U.S. Pat. No. 6,682,422 B1;

which is a continuation of U.S. application Ser. No. 09/102,403, filed Jun. 22, 1998 in the name of Walker et al. and entitled GAMING DEVICE AND METHOD OF OPERATION THEREOF, which issued Feb. 20, 2001 as U.S. Pat. No. 6,190,256 B1.

The entirety of each of the above applications is incorporated by reference herein for all purposes.

BACKGROUND

There are currently over 600,000 gaming devices in the U.S., including slot machines, video poker machines, video blackjack machines and the like. While these gaming devices are highly profitable to casinos, inconveniences and delays exist that limit a player from initiating or continuing game play, thus reducing the profitability of such gaming devices to the casinos.

For example, most gaming devices require the player to provide coins, tokens, or bills as a wager in order to play. While wagering credits or funds is the basis of most gambling, it sometimes occurs that a player runs out of funds or credits accepted by the gaming device, while still having the ability to access additional funds or credits at a remote location. In these cases the player is typically required to leave the gaming device in order to obtain these additional credits or funds (e.g., the player may need to go to an ATM machine or to a casino cage to exchange table game chips). This is disadvantageous to the casino because the player may choose not to return to the gaming device. Even if the player chooses to return to the gaming device, time is wasted while the funds are being obtained.

In summary, casinos and players would benefit from methods and systems that alleviate some of the delays and inconveniences that accompany the operation of gaming devices.

BRIEF DESCRIPTION OF THE DRAWINGS

FIG. 4 is a table illustrating an example data structure of an example prior art probability database for use in some embodiments of the present invention.

FIG. 5 is a table illustrating an example data structure of an example payout database for us in some embodiments of the present invention.

FIGS. 6A and 6B are a table illustrating an example data structure of an example player database for use in some embodiments of the present invention.

FIG. 7 is a table illustrating an example data structure of an example gaming session database for use in some embodiments of the present invention.

FIG. 8 is a table illustrating an example data structure of an example rules database for use in some embodiments of the present invention.

FIG. 9 is a table illustrating an example data structure of an example available offers database for use in some embodiments of the present invention.

FIG. 10 is a table illustrating an example data structure of an example loan database for use in some embodiments of the present invention.

DETAILED DESCRIPTION OF THE INVENTION

Figure 1A:
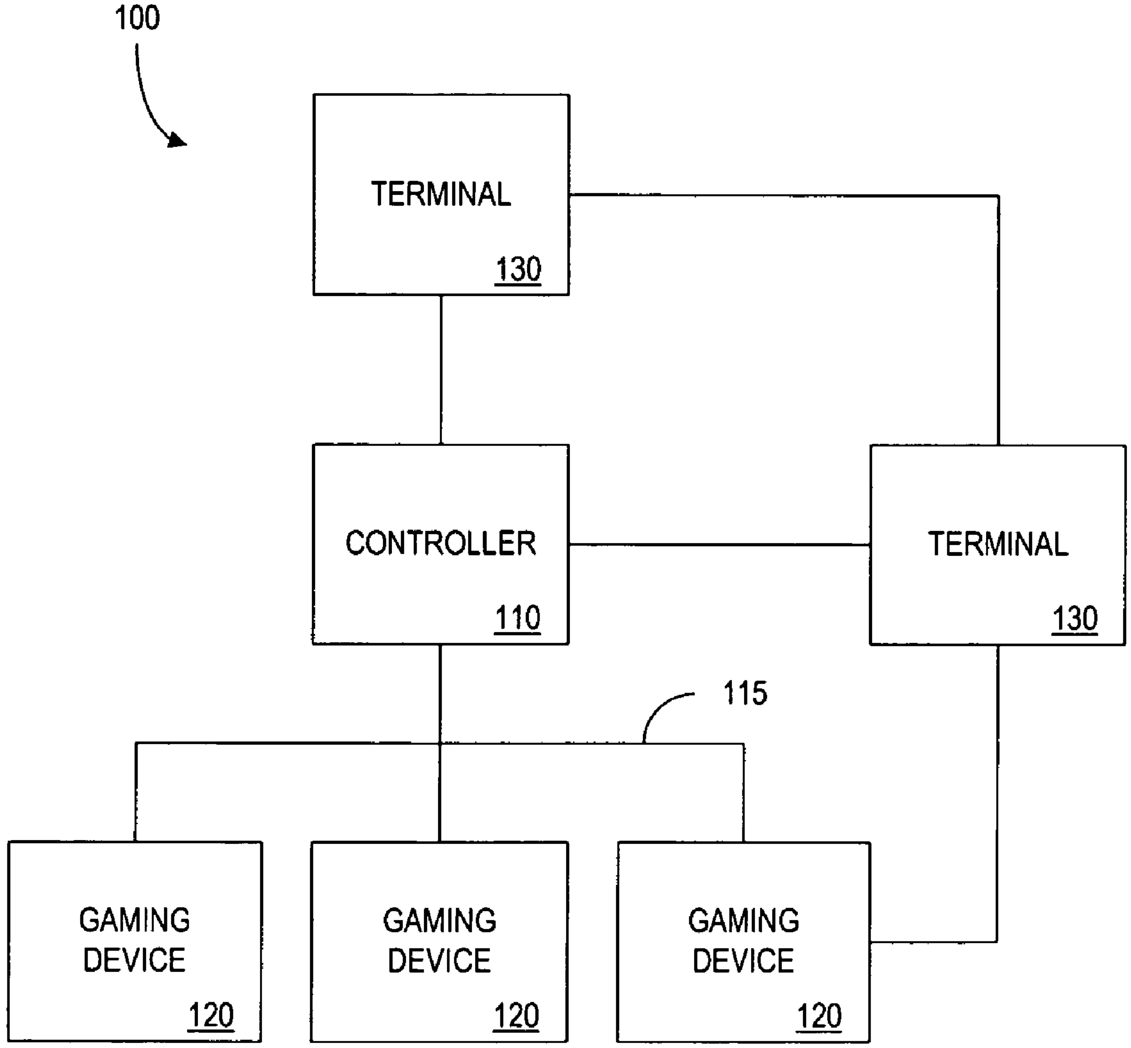
FIG. 1A is a block diagram illustrating an example system in accordance with one or more embodiments of the present invention.

Applicants have recognized that, in some situations, a player of a gaming device runs out of funds yet would like to continue playing the gaming device. For example, a player may have lost all of the cash the player had on his person but may now believe that the gaming device is “due to win”. Additionally, if the player had lost money to the gaming device, the player may feel a sense of equity in the gaming device and may be reluctant to allow another player to attempt to obtain a payout from the gaming device.

Applicants have further recognized that, in some situations, a casino would benefit from allowing the player to continue playing even though the player has run out of funds. For example, a casino may benefit from the casino floor appearing busy to other potential players. Additionally, the casino may benefit from providing the player with a further benefit of getting used to playing the gaming device for a longer period of time.

Applicants have yet further recognized that, in some situations, it may be advantageous for a casino to provide a means for a player who runs out of funds to keep playing, without first requiring the player to provide payment therefore. For example, a casino may allow a player to subsequently pay back any amount lent to the player. The casino may benefit from this repayment by obtaining additional revenue in the form of the repayment.

Applicants have also recognized that a casino has a variety of information at its disposal on which it can determine whether a player is sufficiently risk worthy to be allowed to begin or continue playing a gaming device without having to provide payment therefore. For example, a casino typically maintains a variety of data on players. Such information may include information on a player’s past and current gambling behavior, a player’s contact information, whether the player is a current casino hotel guest, and credit card account information of the player. Applicants have recognized that such information may be utilized by the casino to determine whether it is worth the risk to allow a player to begin or continue playing a gaming device without first providing payment therefore.

Applicants have further recognized that, in some situations, even if a casino does not have access to sufficient information to determine whether a player is sufficiently risk worthy, it may still be advantageous to the casino to provide a player with the means to continue or begin playing a gaming device for at least a few game plays. For example, a casino's exhibition of trust in a player by so allowing the player to continue or begin playing the gaming device may result in the player's future loyalty to the casino.

In the prior art, casinos have extended credit to players of table games, typically to players with an associated status of "high roller". Casinos do this by having a casino employee personally approach a player and offer an extension of credit. Casinos are able to relatively easily determine which table game player to extend credit to because the dealers and pit bosses of the table games are able to observe the player's behavior at the table games to evaluate the player's gambling habits and make a judgment call on the player's credit worthiness. Additionally, there are relatively few players of table games in a casino at a given time who may have a sufficiently established relationship with the casino to be offered an extension of credit by a casino employee. Accordingly, it is not unduly burdensome for casino employees to individually offer extensions of credit to these players of table games.

Until the applicant's related invention described in U.S. Pat. No. 6,190,256 and the continuations thereof (each of which are incorporated by reference herein), and the enhancements of such methods as well as additional methods described herein, however, no mechanism existed for extending loans of credit to players of gaming devices. The methods of extending credit to players of table games would be impractical to apply to player of gaming devices for a variety of reasons.

First, the players of gaming devices do not closely interact with casino employees who may easily observe the players' gambling habits.

Second, there are a substantially larger number of gaming device players on a casino floor at any given time than there are table game players, thus making it impractical to determine which of the multitude of players of gaming devices is eligible for an extension of a loan, much less to extend such a loan by personally approaching each player of a gaming device with an offer for an extension of a line of credit (the method by which credit is extended to players of table games).

Third, the average amount of credit likely to be offered to a player of a gaming device would not justify the resources a casino would spend on each loan if the methods of extending credit to players of table games were applied to players of gaming devices. The amount of credit sufficient to enable a gaming device player to play for an amount of time or number of game plays likely to be satisfactory to the player is relatively minute compared to the amount of credit sufficient to enable a player of a table game to continue playing for an amount of time or game plays likely to be satisfactory to the player. For example, in order to justify the resources (e.g., personnel time, paperwork) expended by a casino to extend credit to a player of a table game, the line of credit is typically relatively large (e.g., in the thousands of dollars). However, a player of a gaming device is likely to be very satisfied with an extension of a loan in the amount of about twenty dollars. However, it may not be considered worthwhile for a casino to send an employee to fill out paperwork documenting an extension of a loan in the amount of twenty dollars or so to every player of a gaming device that may be deemed a desirable recipient of such an offer.

Further, because the amount of credit loaned to a player of a gaming device is likely to be minute compared to the amount of credit typically loaned to a player of a table game, a casino may be willing to extend a significantly larger number of such loans.

Thus, a need exists for automated methods of extending, processing, and settling such loans. The methods applied to loans of credit to players of table games, essentially a manual process based on a personal relationship with the players, would be impractical to apply to loans of credit to players of gaming devices. In other words, it would be impractical for casino employees to determine which of the hundreds, if not thousands, of players of gaming devices on a casino floor at any given time are desirable recipients of an offer for a loan of credit, much less to handle the processing of the offers.

Further, because the amount of credit loaned to a player of a gaming device is likely to be minute compared to the amount of credit typically loaned to a player of a table game, a casino may not always be concerned with collecting repayment of the loan of a gaming device player. Accordingly, the methods of extending loans of credit to players of table games, which typically require repayment in all circumstances because of the relatively large amount of money involved, would be inapplicable to the relatively minute amounts of loans to players of gaming devices. For example, a need exists for determining which loans repayment will be pursued for and/or for determining which loans will be forgiven without requiring repayment.

Further still, if a loan is to be provided to a player of a gaming device, methods and systems are needed to efficiently provide electronic credits to a player, since the electronic credits are the currency necessary to initiate game plays on a gaming device. In table games, a casino employee physically hands chips to a player to whom a line of credit has been extended. This method is inapplicable to gaming devices.

Embodiments of the invention described herein allow a casino to evaluate the hundreds, if not thousands, of players of gaming devices at any given time to determine which, if any, of the players should be presented with an offer for a loan. Embodiments of the present invention allow the casino to perform this evaluation by analyzing, via a computing device, various data associated with, for example, each player, gaming device, and the casino in general. Embodiments of the present invention further allow a casino to efficiently, via a computing device, track the repayment of each such loan extended to a player of a gaming device.

Accordingly, in one or more embodiments, an occurrence of a predetermined event is determined, where the predetermined event is not an outcome of a game conducted on the gaming device. In response to the occurrence, a number of electronic credits are added to a credit meter of a gaming device. The electronic credits are added without the player of the gaming device having first provided payment therefore. An addition of electronic credits to a credit meter of a gaming device, without the player having first provided payment therefore, is referred to as a loan of electronic credits herein.

Examples of the predetermined event that may cause the electronic credits to be added include a player attempting to cash out of a gaming device, a player removing or attempting to remove a player tracking card from a gaming device, the credit meter balance reaching zero or being within a predetermined range of zero, and the player placing a wager that will result in the credit meter balance reaching zero or being within a predetermined range of zero.

In one or more embodiments, instead of electronic credits being provided to the player, one or more tokens representing electronic credits are provided to the player. For example, a cashless gaming receipt, a magnetic stripe card having an amount of currency encoded thereon or an account number associated with an amount of currency encoded thereon, coins, bills or casino tokens may be provided to the player. Such a provision of one or more tokens representative of electronic credits is also referred to as a loan of electronic credits herein.

In one or more embodiments, an offer for the addition of the electronic credits (e.g., an offer for a loan of electronic credits) it output to the player before the electronic credits are added to the credit meter balance. Thus, in one or more embodiments, a determination of whether to output the offer to the player may be performed. Such a determination may be based on, for example, in formation associated with at least one of the player, the gaming device, and the casino. For example, a rating of the player that indicates the value of the player to the casino may be determined. In another example, a credit worthiness of the player may be determined. In yet another example, a performance of the gaming device and/or the casino (e.g., during the player's gaming session) may be determined.

In one or more embodiments, an identifier identifying a player is received. It is then determined whether the player owes payment for at least one of (i) a number of electronic credits previously added to a credit meter balance of a gaming device being played by the casino player, and (ii) a token representative of a number of electronic credits, the token having been previously provided to the casino player. If it is determined that the casino player owes the payment, a message reminding the casino player of the owed payment may be output to the casino player. Such a process may be conducted by, for example, a gaming device or a casino terminal (e.g., a kiosk in the casino).

In one or more embodiments, a player may be allowed to provide the payment at a gaming device. For example, when a player inserts his player tracking card into a gaming device, it may be determined (based on the identifier of the player tracking card) that the player owes the casino a payment for a loan previously provided to the player. The player may be allowed to repay the casino by inserting money into the gaming device intended as the repayment or by allowing an amount sufficient for the repayment to be deducted from the credit meter balance of the gaming device.

Various examples will now be described, to illustrate some embodiments of the present invention.

EXAMPLE 1

A player begins play at a $1 slot machine by inserting a $20 bill into the machine, establishing a balance of twenty (20) credits. The player experiences a run of bad luck and quickly loses the entire twenty (20) credits. The player believes that the machine is now "due" for a big winner, but he has left the rest of his cash in his hotel room. He worries that if he leaves to go get more cash another player might take the machine and win "his" money. The player then notices a "Temporary Credit" button on the machine which indicates that he may be eligible for temporary credit of up to thirty (30) credits. The player presses the button and is instructed to insert his player tracking card. Based on the player's previous gambling history and the fact that the player is currently staying at the hotel, the gaming device authorizes a short term loan of twenty (20) credits. The credits are immediately added to the credit balance of the machine, and the player is able to resume play. The slot server stores an indication of the amount of the loan. The player continues to play and enjoys a long winning streak, ending his session with a balance of 125 credits. After pressing the cashout button, the gaming device subtracts the amount of the loan from the balance in the machine and provides 105 coins to the player (125 credits less the twenty (20) credit loan). The slot server records that the loan has been repaid and the player leaves to convert his coin into cash.

EXAMPLE 2

A player begins play at a $1 slot machine by inserting a $20 bill into the machine, establishing a balance of twenty (20) credits. He also provides a player tracking card so that he can earn comps for his play. The player experiences a run of bad luck and quickly loses the entire twenty (20) credits. The player would like to continue play, but he does not have any more cash to insert into the bill validator. He has $100 in casino chips from a previous win at the blackjack tables, but those chips are not accepted by the gaming device. The player presses the "Temporary Credit" button on the slot machine. Because the customer has a valid credit card number associated with his player tracking card, the gaming device authorizes a short term loan of thirty (30) credits. The credits are immediately added to the credit balance of the machine, and the player is able to resume play. The slot server stores an indication of the amount of the loan. While a credit card number is associated with the player, the amount of the loan (thirty (30) credits) is not applied to the card. The card is simply used as an indication that the player is generally creditworthy. The player continues to play but unfortunately loses the loaned thirty (30) credits. When he removes his player tracking card, the gaming device prints a reminder to the player (via the cashless gaming receipt printer) that he owes the casino $30 and that payment can be made at the casino cage, slot club center, or any change booth. The player goes to the casino cage to cash in his $100 in casino chips and provides his player tracking card and an indication that he has an outstanding loan. The cashier swipes his card, sends a signal to the slot server that the loan has been repaid, and pays the player $70 ($100 less the $30 loan repayment).

EXAMPLE 3

A player begins play at a $1 slot machine by inserting a $20 bill into the machine, establishing a balance of twenty (20) credits. He also provides a player tracking card so that he can earn comps for his play. The player experiences a run of bad luck and quickly loses the entire twenty (20) credits. The player would like to continue play, but has run out of the money he had set aside for gambling that trip. The player removes his player tracking card to end the session, but the display device of the gaming machine flashes a promotional message before he has a chance to get up. The player is informed that because he has been a regular player at the casino, the gaming device is authorized to provide him with temporary credit of $15. Should he not be able to repay the loan through winnings at the machine, the loan amount will simply remain an open loan (at no interest) on the books of the casino until it is paid off. The player accepts the offer and fifteen (15) credits are added to the credit balance of the machine. The player presses the cashout button, but it is disabled until he has generated enough winnings to pay off the $15 loan.

The scope of the present invention and embodiments thereof may be understood more fully with reference to the following figures. It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Terms used throughout the present description will first be introduced. Embodiments of the present invention will then be introduced by means of block diagrams that illustrate some systems and devices that may be utilized by an entity practicing the present invention. Exemplary data structures illustrating tables that may be used when practicing embodiments of the present invention will then be described, along with corresponding flowcharts that illustrate exemplary processes that utilize the exemplary tables.

A. Terms

Throughout the description that follows and unless otherwise specified, the following terms may include and/or encompass the example meanings provided in this section. These terms and illustrative example meanings are provided to clarify the language selected to describe embodiments of the invention both in the specification and in the appended claims.

The term "cashless gaming receipt" shall refer to an instrument of value output by a device (e.g., a gaming device, a terminal, a peripheral device) representing at least one of a monetary value and a number of electronic credits. This instrument may be wagered at a gaming device (e.g., by being inserted into the gaming device or by having a bar code printed thereon scanned by the gaming device) and/or may be redeemable for cash.

The term "casino" may refer to the owner of gaming devices, owners' agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g. the uniform resource locator (URL)) of the online casino's Web site or facility.

The terms "game play", "handle pull" "spin" shall be synonymous and may refer to a single play at a gaming device. In some embodiments, a handle pull may refer to a single complete game (or hand) or in other embodiments, the term may refer to a play related to a single wager. For example, in video blackjack, a user might play a single game play in which he splits a pair of sevens, requiring an additional wager. This single game play may be considered to include one or multiple handle pulls in different embodiments. A game play played on a gaming device, as used herein, is to be contrasted with a type of game playable on a gaming device. A type of game playable on a gaming device may comprise, for example, "Triple Play Draw Poker"™ (a type of video poker game by International Game Technology™ (IGT™)) and "X-Factor"™ (a type of reeled slot machine game from Williams Gaming™). A game play of a gaming device, in contrast, consists of an individual attempt to win a benefit available in the type of game being played, e.g., by placing a wager and actuating a game initiation mechanism. For example, a player's actuation of a start or deal button (e.g., if the gaming device is a video poker device) or pull of a handle (e.g., if the gaming device is a reeled slot machine) may cause an initiation of a game play.

The term "gaming device" may refer to any electrical, mechanical, electromechanical and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, pachinko machines, arcade games, video games, pinball machines, skill crane machines, video lottery terminals, online gaming systems, sports betting machines, game consoles, personal computers logged into online gaming sites, etc. Gaming devices may or may not be owned and/or maintained by a casino and/or may or may not exist within a casino location.

The term "input device" may refer to a device that is used to receive an input. An input device may communicate with or be part of another device (e.g. a point of sale terminal, a point of display terminal, a terminal, a server, a player device, a gaming device, a controller, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a gaming device, a point of sale terminal, a point of display terminal, a player device, a casino device, a controller, etc.). Possible output devices include: a cathode ray tube (CRT) monitor, liquid crystal display (LCD) screen, light emitting diode (LED) screen, a printer, an audio speaker, an infra-red transmitter, a radio transmitter.

The term "I/O device" may refer to any combination of input and/or output devices.

The terms "player" and "user" shall be synonymous and may refer to any person or entity that operates a user device, a gaming device, and/or a user terminal.

The terms "player device" and "user device" shall be synonymous and may refer to any device owned or used by a user or player capable of accessing and/or displaying online and/or offline content. Player devices may communicate with one or more controllers, one or more gaming devices, one or more third-party service provider servers, one or more terminals, and/or other network nodes. In some embodiments, player devices may, for example, include gaming devices, personal computers, personal digital assistants, point-of-sale terminals, point of display terminals, kiosks, telephones, cellular phones, automated teller machines (ATMs), pagers, and combinations of such devices.

The term "player tracking card" may refer to a device that may be capable of identifying and/or storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store player and/or group membership and/or group format information.

The terms "server" and "controller" shall be synonymous and may refer to any device that may communicate with one or more one or more gaming devices, one or more third-party servers, one or more remote controllers, one or more player devices, and/or other network nodes, and may be capable of relaying communications to and from each.

The term "terminal" may refer to any device that may communicate with one or more casino servers, one or more gaming devices, one or more third-party service provider servers, one or more player devices, and/or other network nodes. Terminals may, for example, include personal computers, laptop computers, handheld computers, telephones, kiosks, automated teller machines, gaming devices, game consoles, and/or vending machines. They may include facilities to support secure communications using encryption or the like.

B. Systems and Devices

Referring now to FIG. 1A, illustrated therein is a block diagram of an example system 100 that may be used to implement embodiments of the present invention. The system 100 includes a controller 110 (e.g., a slot server of a casino) that is in communication, via a communications network, with one or more gaming devices 120 (e.g., slot machines, video poker machines) and one or more terminals 130 (e.g., kiosks accessible by players and/or casino employees in a casino). The controller 110 may communicate with the gaming devices 120 and/or terminals 130 directly or indirectly, via a wired or wireless medium such as the Internet, LAN, WAN or Ethernet, Token Ring, or via any appropriate communications means or combination of communications means.

Each of the gaming devices 120 and the terminals 130 may comprise computers, such as those based on the Intel® Pentium® processor, that are adapted to communicate with the controller 110. Further, each of the gaming devices 120 may comprise a gaming device such as a mechanical or electronic slot machine, a video poker machine, a video blackjack machine, a video keno machine, a pachinko machine, a video roulette machine, and/or a lottery terminal. Further still, each of the terminals 130 may comprise a stand-alone kiosk accessible by a player at a casino or a computing terminal accessible by a casino employee (e.g., in a casino cage or booth). A terminal 130 may be operable, for example, to output an offer for a loan of electronic credits to a player, to output information about one or more outstanding loans associated with a player and/or to receive repayment for one or more loans associated with a player. For example, a player may approach a terminal 130 on a casino floor, insert his player tracking card, and be presented with an amount owed by the player for any loans previously accepted by the player. The player may then insert payment (e.g., coins, bills, casino tokens, a credit or debit card, etc.) into the terminal in order to provide payment for the amount owed.

Any number and type of gaming devices 120 may be in communication with the controller 110. Similarly, any number of terminals 130 may be in communication with the controller 110.

In one or more embodiments, a terminal 130 may be in communication with one or more gaming devices 120, in addition to or in lieu of being in communication with the controller 110. Similarly, in one or more embodiments, a terminal 130 may be in communication with another terminal 130 and a gaming device 120 may be in communication with another gaming device 120.

Communication between the gaming devices 120, the terminals 130 and the controller 110, among the terminals 130 and among the gaming devices 120, may be direct or indirect, such as over the Internet through a Web site maintained by controller 110 on a remote server or over an on-line data network including commercial on-line service providers, bulletin board systems and the like. In yet other embodiments, the gaming devices 120 and/or the terminals 130 may communicate with one another and/or controller 110 over RF, cable TV, satellite links and the like.

Some, but not all, possible communication networks that may comprise network 115 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the controller 110 may not be necessary and/or preferred. For example, the present invention may, in one or more embodiments, be practiced on a stand-alone gaming device 120 and/or a gaming device 120 in communication only with one or more other gaming devices 120 and/or one or more terminals 130. In such an embodiment, any functions described herein as performed by the controller 110 or data described herein as stored on the controller 110 may instead be performed by or stored on one or more gaming devices 120 and/or one or more terminals 130.

Figure 1B:
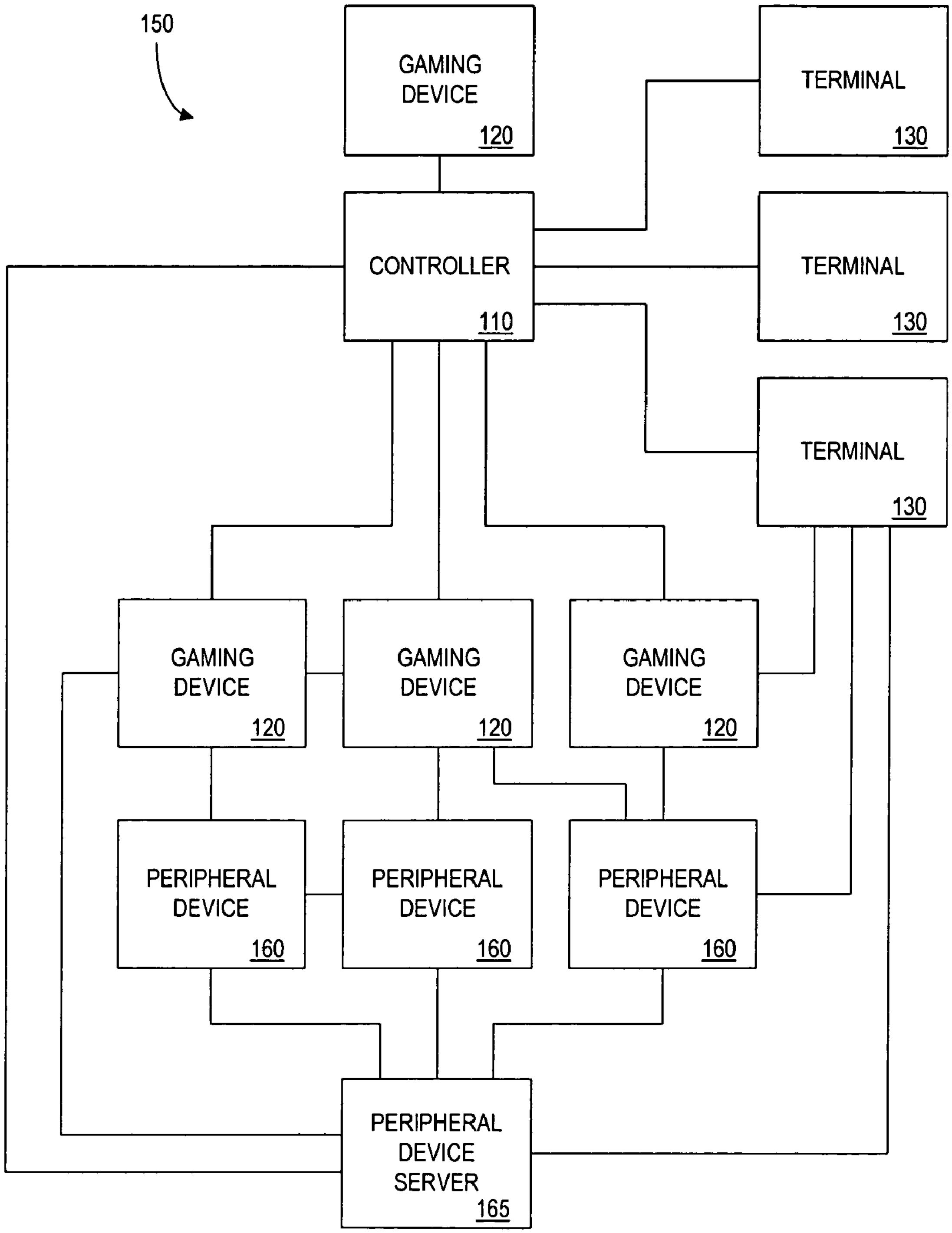
FIG. 1B is a block diagram illustrating an alternate example system in accordance with one or more embodiments of the present invention.

Referring now to FIG. 1B, a block diagram of another example system 150 according to at least one embodiment of the present invention includes a controller 110 (e.g., a slot server of a casino) that is in communication, via a communications network, with one or more gaming devices 120 (e.g., slot machines, video poker machines) and with one or more terminals 130. A difference between system 100 (FIG. 1A) and system 150 (FIG. 1B) is that in system 150 at least one gaming device 120 is also in communication with one or more peripheral devices 160. A peripheral device 160 may, in turn, be in communication with a peripheral device controller 165 and, in some embodiments, with controller 110. In one or more embodiments the peripheral device controller 165 may be in communication with one or more gaming devices 120, with one or more terminals 130 and/or controller 110.

The controller 110 may communicate with the gaming devices 120, the terminals 130, the peripheral devices 160 and the peripheral device controller 165 (and the devices may communicate among one another) directly or indirectly, via a wired or wireless medium such as the Internet, LAN, WAN or Ethernet, Token Ring, or via any appropriate communications means or combination of communications means. For example, the controller 110 may communicate directly with one of the gaming devices 120 (e.g., via a LAN) and indirectly (e.g., via a gaming device 120) with a peripheral device 160. In another example, the controller 110 may communicate with one of the gaming devices 120 via a LAN and with another of the gaming devices 120 via the Internet (e.g., if the particular gaming device comprises a personal computer in communication with an online casino).

Each of the gaming devices 120, the terminals 130, the peripheral devices 160, and the peripheral device controller 165 may comprise computers, such as those based on the Intel® Pentium® processor, that are adapted to communicate with the controller 110. Further, each of the gaming devices 120 may comprise a gaming device such as a mechanical or electronic slot machine, a video poker machine, a video blackjack machine, a video keno machine, a pachinko machine, a video roulette machine, and/or a lottery terminal. Further still, each of the terminals 130 may comprise a stand-alone kiosk accessible by a player at a casino. Further yet, each of the peripheral devices 160 may comprise an external or internal module associated with one or more of the gaming devices 120 that is capable of communicating with one or more of the gaming devices 120 and of directing the one or more gaming devices 120 to perform one or more functions. The peripheral device controller 165 may comprise one or more computers operable to receive information to and/or from a peripheral device 160 and to direct the peripheral device 160 to perform certain functions.

Any number of gaming devices 120 may be in communication with the controller 110. Similarly, any number and type of peripheral devices 160 may be in communication with a gaming device 120, peripheral device controller 165 and/or controller 110.

Communication (i) between the gaming devices 120 and the controller 110, (ii) between the gaming devices 120 and the peripheral devices 160, (iii) among the gaming devices 120, (iv) among the peripheral devices 160, (v) between the peripheral device controller 165 and the peripheral devices 160, the controller 110 and/or the gaming devices 120, (v) between the peripheral device controller 160 and controller 110, (vi) between the controller 110 and the terminals 130, (vii) among the terminals 130, (viii) between a gaming device 120 and a terminal 130, (ix) between a terminal 130 and a peripheral device 160, and (x) between a terminal 130 and the peripheral device controller 165 may be direct or indirect, such as over the Internet through a Web site maintained by controller 110 on a remote server or over an on-line data network including commercial on-line service providers, bulletin board systems and the like. In yet other embodiments, any and all of the devices of system 150 (i.e., the controller 110, the gaming devices 120, the terminals 130, the peripheral devices 160, and the peripheral device controller 165) may communicate with one another over RF, cable TV, satellite links and the like.

Some, but not all, possible communication networks that may be part of system 150 include: a local area network (LAN), a wide area network (WAN), the Internet, a telephone line, a cable line, a radio channel, an optical communications line, a satellite communications link. Possible communications protocols that may be part of system 150 include: Ethernet (or IEEE 802.3), SAP, ATP, Bluetooth™, and TCP/IP. Communication may be encrypted to ensure privacy and prevent fraud in any of a variety of ways well known in the art.

In some embodiments, the controller 110 may not be necessary and/or preferred. For example, the present invention may, in one or more embodiments, be practiced on a stand-alone gaming device 120, one or more gaming devices 120 in communication with one or more peripheral devices 160, one or more gaming devices in communication with peripheral device server 165, one or more peripheral devices 240 in communication with peripheral device controller 165, one or more gaming devices 120 in communication with one or more terminals 130, and/or a gaming device 120 in communication only with one or more other gaming devices 120. In such embodiments, any functions described herein as performed by the controller 110 or data described herein as stored in a memory of the controller 110 may instead be performed by or stored on one or more gaming devices 120, one or more terminals 130, one or more peripheral devices 160, and/or peripheral device controller 165.

Similarly, peripheral device controller 165 may not be desired and/or needed in some embodiments of the present invention. In embodiments that do not involve peripheral device controller 165, any or all of the functions described herein as being performed by peripheral device controller 165 may instead be performed by controller 110, one or more gaming devices 120, one or more terminals 130, one or more peripheral devices 160, or a combination thereof. Similarly, in embodiments that do not involve peripheral device controller 165 any data described herein as being stored in a memory of peripheral device controller 165 may instead be stored in a memory of controller 110, one or more gaming devices 120, one or more terminals 130, one or more peripheral devices 160, or a combination thereof.

Any or all of the gaming devices 120 may, respectively, include or be in communication with one or more peripheral devices 160. A peripheral device 160 may be a device that obtains (e.g., receives or reads) information from (and/or transmits information to) one or more gaming devices 120. For example, a peripheral device 160 may be operable to obtain information about games being played on a gaming device 120, such as the initiation of a game and/or a random number that has been generated for a game. For example, a peripheral device 160 may monitor activities carried out by a processor of a gaming device 120.

In one or more embodiments, one or more such peripheral devices 160 may be in communication with a peripheral device controller 165. This allows the peripheral device controller 165 to, for example, receive information regarding a plurality of games being played on a plurality of gaming devices 120. The peripheral device controller 165, in turn, may be in communication with the controller 110. It should be understood that any functions described herein as performed by a peripheral device 160 may also or instead be performed by the peripheral device controller 165 and vice versa. Similarly, any data described herein as being stored on or accessed by a peripheral device 160 may also or instead be stored on or accessed by the peripheral device controller 165 or vice versa.

A peripheral device 160 may be operable to access a database (e.g., of peripheral device controller 165) to provide benefits (e.g., cashless gaming receipts) based on, for example, an acceptance, from a player, of an offer for a token representative of electronic credits. In another example, a peripheral device 160 may also be operable to access a database (e.g., a player database, as described in more detail below) to determine whether to output an offer for electronic credits to a player and/or to determine how many electronic credits to provide to a player.

The peripheral device controller 165 may also monitor player gambling history over time by associating gambling behavior with player identifiers, such as player tracking card numbers. For example, in embodiments wherein a player accepts an offer for electronic credits, the peripheral device controller 165 may track whether the player eventually provided payment for the electronic credits. The peripheral device controller 165 may subsequently use that information to, for example, determine whether other offers for electronic credits should be output to the player. Further, information about the player obtained or accessed by peripheral device controller 165 may be analyzed, e.g., to identify those players that a particular gaming machine owner, operator, or manufacturer finds most desirable. Based upon desired objectives, the peripheral device controller 165 may direct the appropriate peripheral device 160 to issue customized offers to specific players, offers that are relevant to their gambling behaviors.

Information obtained by a peripheral device 160 from a gaming device 120 may include gambling data such as number of game plays initiated per unit of time, outcomes displayed for game plays initiated, payouts corresponding to outcomes displayed, a credit meter balance of the gaming device, and/or data associated with the player currently playing the gaming device 120.

The functions described herein as being performed by a peripheral device controller 165 and/or a peripheral device 160 may, in one or more embodiments, be performed by the controller 110 (in lieu of or in conjunction with being performed by a peripheral device controller 165 and/or a peripheral device 160). Such functions may be performed by controller 110 in either system 100 (FIG. 1A) or system 150 (FIG. 1B).

In one or more embodiments, a peripheral device 160 may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device 160 may be inserted in or associated with the gaming device. For example, a conventional gaming device may be retrofitted with a peripheral device 160 in order to implement one or more embodiments of the present invention.

Thus, for example, a peripheral device 160 may be utilized to monitor play of the gaming device and output messages to a player. In one or more embodiments, the peripheral device may output a code that the player may enter into a gaming device, the code being recognizable by the gaming device as being representative of a number of electronic credits. Thus, the gaming device may add the number of electronic credits to its credit meter balance upon receiving such a code. The code may be output by the peripheral device 160 in the form of, for example, text displayed on a display device and/or a printed instrument. In other embodiments, the peripheral device 160 may output one or more tokens recognizable by a gaming device as representative of a number of electronic credits. Such one or more tokens may comprise, for example, a cashless gaming receipt (e.g., including a bar code readable by a bar code scanner of a gaming device), a magnetic stripe card encoded with a number of electronic credits, or currency in the form of coins, bills, and/or casino tokens. It should be noted that, in other embodiments, a gaming device may be operable to output such one or more tokens representative of a number of electronic credits.

In any of the embodiments described immediately above, the gaming device 120 with which the peripheral device 160 is in communication with may continue to operate conventionally. For example, the gaming device 120 may continue to output outcomes, payouts, and bonuses for each game play, as appropriate. The peripheral device 160, however, may output offers for electronic credits to a player. For example, the peripheral device 120 may output the following message to a player who just wagered and lost the last of his credit meter balance and removed his player tracking card: "Hold on! You've invested a lot in this machine. We think you should have a chance to keep playing it. Would you like to borrow twenty credits to keep playing?". If the player accepts an output offer for electronic credits, the peripheral device 160 may output a code or one or more tokens representative of a number of electronic credits. Alternately, the peripheral device 160 may direct the associated gaming device 120 being played by the player to add the number of electronic credits to the credit meter balance.

Accordingly, a peripheral device 160 may include (i) a communications port (e.g., for communicating with one or more gaming devices 120, peripheral device server 165, another peripheral device 160, and/or controller 110); (ii) a display (e.g., for displaying offers and/or codes), (iii) another output means (e.g., a speaker, light, or motion device to communicate with a player), and/or (iv) a token providing means (e.g., a printer and paper dispensing means, a magnetic stripe card dispenser, and/or a hopper and hopper controller).

In one or more embodiments, the peripheral device 160 may not output offers for electronic credits, codes, and/or tokens representative of electronic credits but may instead direct the processor of a gaming device 120 to perform such functions. For example, a program stored in a memory of peripheral device 160 may cause a processor of a gaming device 120 to perform certain functions. For example, a program stored in a memory of peripheral device 160 may cause a processor of a gaming device 120 to add a specified number of electronic credits to the credit meter balance of the gaming device.

Note that, in one or more embodiments, a gaming device 120 and a peripheral device 160 that is associated with the gaming device 120 may not communicate directly with one another at all. Each may, however, communicate with a computer or other device. For example, a gaming device 120 may communicate with controller 110 and an associated peripheral device 160 may communicate with peripheral device controller 165 and/or controller 110. For example, if both gaming device 120 and peripheral device 160 are in communication with controller 110, each may obtain information associated with the other through controller 110.

Figure 2:
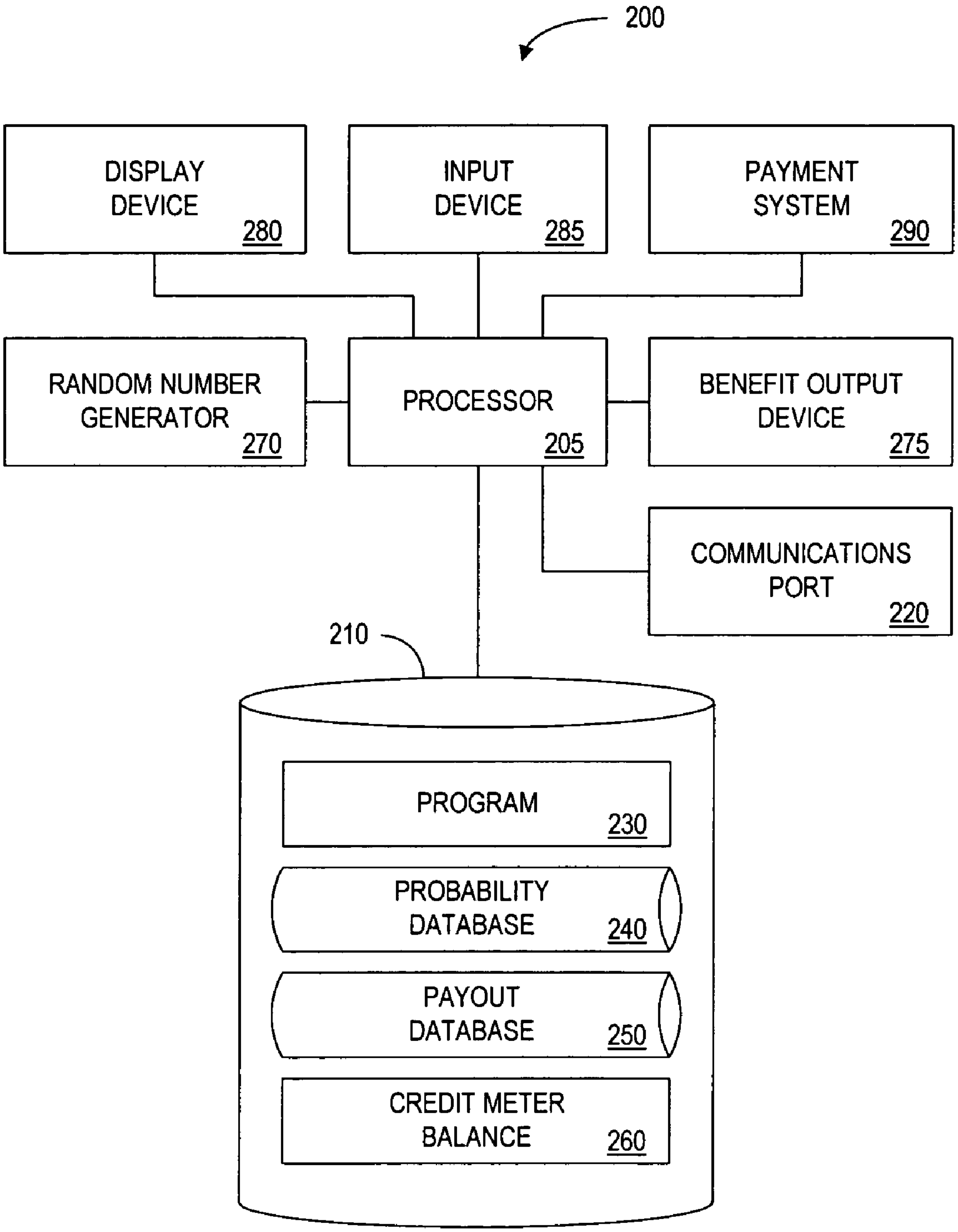
FIG. 2 is a block diagram illustrating the details of an example gaming device in accordance with one or more embodiments of the present invention.

Referring now to FIG. 2, illustrated therein is a block diagram of an embodiment 200 of a gaming device (referred to herein as gaming device 200). The gaming device 200 may be implemented as a system controller, a dedicated hardware circuit, an appropriately programmed general-purpose computer, or any other equivalent electronic, mechanical or electromechanical device. The gaming device 200 may comprise, for example, a slot machine, a video poker terminal, a video blackjack terminal, a video keno terminal, a video lottery terminal, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant or Nintendo GameBoy). The gaming device 200 may comprise any or all of the gaming devices 120 of system 100 (FIG. 1A) or system 150 (FIG. 1B). In some embodiments, a user device such as a PDA or cell phone may be used in place of, or in addition to, some or all of the gaming device 200 components depicted in FIG. 2. Further, a gaming device may comprise a personal computer or other device operable to communicate with an online casino and facilitate game play at the online casino. In one or more embodiments, the gaming device 200 may comprise a computing device operable to execute software that simulates play of a reeled slot machine game, video poker game, video blackjack game, video keno game, video roulette game, or lottery game.

The gaming device 200 comprises a processor 205, such as one or more Intel® Pentium® processors. The processor 305 is in communication with a memory 210 and a communications port 320 (e.g., for communicating with one or more other devices). The memory 210 may comprise an appropriate combination of magnetic, optical and/or semiconductor memory, and may include, for example, Random Access Memory (RAM), Read-Only Memory (ROM), a compact disc and/or a hard disk. The memory 210 may comprise or include any type of computer-readable medium. The processor 205 and the memory 210 may each be, for example: (i) located entirely within a single computer or other device; or (ii) connected to each other by a remote communication medium, such as a serial port cable, telephone line or radio frequency transceiver. In one embodiment, the gaming device 200 may comprise one or more devices that are connected to a remote server computer for maintaining databases.

The memory 210 stores a program 230 for controlling the processor 205. The processor 205 performs instructions of the program 230, and thereby operates in accordance with the present invention, and particularly in accordance with the methods described in detail herein. The program 230 may be stored in a compressed, uncompiled and/or encrypted format. The program 230 furthermore includes program elements that may be necessary, such as an operating system, a database management system and "device drivers" for allowing the processor 205 to interface with computer peripheral devices. Appropriate program elements are known to those skilled in the art, and need not be described in detail herein.

The term "computer-readable medium" as used herein refers to any medium that participates in providing instructions to processor 205 (or any other processor of a device described herein) for execution. Such a medium may take many forms, including but not limited to, non-volatile media, volatile media, and transmission media. Non-volatile media include, for example, optical or magnetic disks, such as memory 210. Volatile media include dynamic random access memory (DRAM), which typically constitutes the main memory. Transmission media include coaxial cables, copper wire and fiber optics, including the wires that comprise a system bus coupled to the processor 205. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 205 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 200 (or, e.g., a controller 110) can receive the data on the telephone line and use an infrared transmitter to convert the data to an infrared signal. An infrared detector can receive the data carried in the infrared signal and place the data on a system bus for processor 205. The system bus carries the data to main memory, from which processor 205 retrieves and executes the instructions. The instructions received by main memory may optionally be stored in memory 210 either before or after execution by processor 205. In addition, instructions may be received via communication port 220 as electrical, electromagnetic or optical signals, which are exemplary forms of carrier waves that carry data streams representing various types of information. Thus, the gaming device 200 may obtain instructions in the form of a carrier wave.

According to an embodiment of the present invention, the instructions of the program 230 may be read into a main memory from another computer-readable medium, such from a ROM to RAM. Execution of sequences of the instructions in program 230 causes processor 205 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 150 of FIG. 1B, execution of sequences of the instructions in a program of a peripheral device 160 in communication with a gaming device such as gaming device 200 may also cause processor 205 to perform some of the process steps described herein.

The memory 210 also stores a plurality of databases, including a probability database 240 and a payout database 250. Each of these databases is described in detail below. Note that, although these databases are described as being stored in a gaming device, in other embodiments of the present invention some or all of these databases may be partially or wholly stored in another device, such as one or more of the peripheral devices 160, the peripheral device controller 165 and/or the controller 110. Further, some or all of the data described as being stored in the databases 240 and 250 may be partially or wholly stored (in addition to or in lieu of being stored in the memory 210 of the gaming device 200) in a memory of one or more other devices, such as one or more of the peripheral devices 160, the peripheral device controller 165 and/or the controller 110.

The memory 210 also stores an credit meter balance 260. The credit meter balance 260 stores a number of electronic credits available to the player for wagering. The credit meter balance 260 is updated as currency is added to or disbursed from the gaming device, as a token representative of electronic credits is inserted into the device, as a token representative of electronic credits is output from the gaming device and/or as the player accepts an offer for a number of electronic credits, thereby causing the number of electronic credits to be added to the credit meter balance.

The processor 205 is also operable to communicate with a random number generator 270, which may be a component of gaming device 200. The random number generator 270, in accordance with at least one embodiment of the present invention, may generate data representing random or pseudo-random values (referred to as "random numbers" herein). The random number generator 270 may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 205. Alternatively, a random number generator may be embodied as an algorithm, program component, or software stored in the memory of gaming device 200 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HotBitS™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 205 is also operable to communicate with a benefit output device 275, which may be a component of gaming device 300. The benefit output device 275 may comprise one or more devices for outputting a benefit to a player of the gaming device 200. For example, in one embodiment the gaming device 200 may provide coins and/or tokens as a benefit (e.g., as a payout associated with an outcome of a game play). In such an embodiment the benefit output device 275 may comprise a hopper and hopper controller, for dispensing coins and/or tokens into a coin tray of the gaming device 200. In another example, the gaming device 200 may provide a receipt or other document on which there is printed an indication of a benefit (e.g., a cashless gaming receipt that has printed thereon a monetary value, which is redeemable for cash in the amount of the monetary value or recognizable by a gaming device as representative of a specified number of electronic credits). In such an embodiment the benefit output device 275 may comprise a printing and document dispensing mechanism.

Note that, in one or more embodiments, the gaming device 200 may include more than one benefit output device 275 even though only one benefit output device is illustrated in FIG. 2. For example, the gaming device 200 may include both a hopper and hopper controller combination and a printer. Such a gaming device may be operable to provide more than one type of benefit to a player of the gaming device. Alternately, a single benefit output device 275 may be operable to output more than one type of benefit.

The processor 205 is also operable to communicate with a display device 280, which may be a component of gaming device 200. The display device 280 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays bonus round graphics and/or other messages to a player (this latter display area may be referred to as a secondary display screen).

The processor 205 may also be in communication with one or more other devices besides the display device 280, for outputting information (e.g., to a player or another device). Such other one or more output devices may also be components of gaming device 200. Such other one or more output devices may comprise, for example, an audio speaker (e.g., for outputting audio information associated with an offer and/or for outputting an audio file of coins dropping into a coin tray), an infra-red transmitter, a radio transmitter, an electric motor, a printer (e.g., such as for printing cashless gaming vouchers), a coupon or product dispenser, an infrared port (e.g., for communicating with a second gaming device or a player device), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

In one or more embodiments, the gaming device 200 may include more than one display device, one or more other output devices, or a combination thereof (e.g., two display devices and two audio speakers).

The processor 205 is also in communication with an input device 285, which is a device that is capable of receiving an input (e.g., from a player or another device) and which may be a component of gaming device 200. An input device 285 may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from with a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 205 is also in communication with a payment system 290, which may be a component of gaming device 200. The payment system 290 comprises one or more devices capable of accepting payment from a player (e.g., a bet or initiation of a balance). Payment is not limited to currency, but may also include other types of consideration, including paper instruments (e.g., cashless gaming receipts), magnetic stripe cards storing an indication of value thereon, and alternate currencies such as (e.g., comp points awarded by a casino).

Exemplary methods of accepting payment by the payment system 290 include (i) receiving hard currency (i.e., coins or bills), and accordingly the payment system 290 may comprise a coin or bill acceptor; (ii) receiving a paper cashless gaming voucher, a coupon, and/or a casino token, and accordingly the payment system 290 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

In one embodiment, a player may operate a plurality of gaming devices. For example, a player may simultaneously play two side-by-side gaming devices, a player may play one gaming device (e.g., a gaming device) and then continue his gaming session at another gaming device (e.g., a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 3:
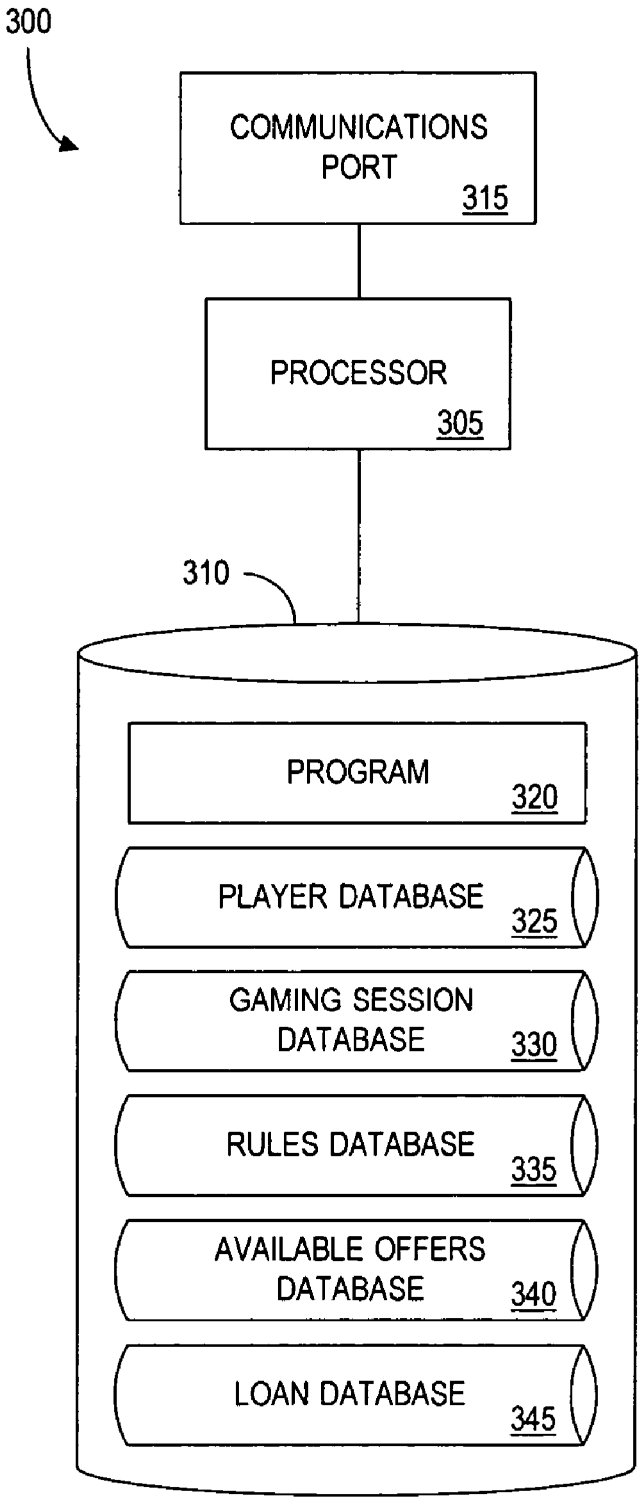
FIG. 3 is a block diagram illustrating the details of an example controller in accordance with one or more embodiments of the present invention.

Referring now to FIG. 3, illustrated therein is a block diagram of an embodiment 300 of controller 110 (referred to as controller 300 herein). The controller 300 may be implemented as a system controller, a dedicated hardware circuit, an appropriately programmed general-purpose computer, or any other equivalent electronic, mechanical or electromechanical device. The controller 300 may comprise, for example, a server computer operable to communicate with one or more client devices, such as gaming devices 120. The controller 300 may be operative to manage, for example, the system 100 and/or the system 150 and execute any and all of the methods of the present invention.

In operation, the controller 300 may function under the control of a casino, a merchant, or other entity that may also control use of the gaming devices 120, peripheral devices 160, and/or peripheral device controller 165. For example, the controller 300 may be a slot server in a casino. In some embodiments, the controller 300 and slot server may be different devices. In some embodiments, the controller 300 may comprise more than one computer operating together. In some embodiments, the controller 300 and peripheral device controller 165 may be the same device.

The controller 300 comprises a processor 305, such as one or more Intel® Pentium® processors. The processor 305 is in communication with a memory 310 and a communications port 315 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The processor 305 and the memory 310 may each be, for example: (i) located entirely within a single computer or other device; or (ii) connected to each other by a remote communication medium, such as a serial port cable, telephone line or radio frequency transceiver. In one embodiment, the computer 300 may comprise one or more devices that are connected to a remote server computer for maintaining databases.

The memory 310 stores a program 320 for controlling the processor 305. The processor 305 performs instructions of the program 320, and thereby operates in accordance with the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein.

According to an embodiment of the present invention, the instructions of the program 320 may be read into a main memory from another computer-readable medium, such from a ROM to RAM. Execution of sequences of the instructions in program 320 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 310 also stores a plurality of databases, including a player database 325, a gaming session database 330, a rules database 335, an available offers database 340, and a loan database 345. Each of these databases is described in detail below. Note that, although these databases are described as being stored in a controller, in other embodiments of the present invention some or all of these databases may be partially or wholly stored in another device, such as one or more gaming devices 120, one or more of the peripheral devices 160, the peripheral device controller 165, one or more terminals 130, a slot server (if different from the controller 300), another device, or a combination thereof. Further, some or all of the data described as being stored in the databases 325 through 345 may be partially or wholly stored (in addition to or in lieu of being stored in the memory 310 of the controller 300) in a memory of one or more other devices, such as one or more of the peripheral devices 160, one or more of the gaming devices 120, the peripheral device controller 165, one or more terminals 130 and/or a slot server (if different from controller 300).

C. Databases

Exemplary data structures of example databases 240, 250, 325, 330, 335, 340 and 345 are described in detail below. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though seven separate databases are illustrated, the invention could be practiced effectively using one, two, three, four, five, six, eight, nine or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

Referring now to FIG. 4, an exemplary tabular representation 400 illustrates an embodiment of a prior art probability database 240. The tabular representation 400 of the probability database includes a number of example records or entries, each defining a random number. Those skilled in the art will understand that the probability database may include any number of entries. The tabular representation 400 also defines fields for each of the entries or records. The fields specify: (i) a random number 410 that is a random number that may be generated by the random number generator of a gaming device; and (ii) an outcome 420, that indicates the one or more indicia comprising the outcome that corresponds to the random number of a particular record. In the particular example illustrated by tabular representation 400, the outcomes comprise the three symbols to be displayed along the payline of a three reel slot machine. A gaming device may utilize a probability database such as that embodied in tabular representation 400 to, for example, determine what outcome corresponds to a random number generated by a random number generator and to display the determined outcome. Note that, in the prior art probability database of FIG. 4, only a single outcome corresponds to each random number and the gaming device utilizing such a probability table simply causes the indicia corresponding to the random number to be displayed as the result of a game on a gaming device.

Referring now to FIG. 5, an exemplary tabular representation 500 illustrates an embodiment of a prior art payout database. The tabular representation 500 of the payout database includes a number of example records or entries, each defining an outcome that may be obtained on a gaming device that corresponds to a payout. Those skilled in the art will understand that the payout database may include any number of entries.

The tabular representation 500 also defines fields for each of the entries or records. The fields specify: (i) an outcome 505, which indicates the one or more indicia comprising a given outcome; and (ii) a payout 510 that corresponds to each respective outcome. In the example illustrated by tabular representation 500, the outcomes are those that may be obtained on a three reel slot machine. The outcomes are also a subset of the outcomes stored as corresponding to one of the random numbers of tabular representation 400 (FIG. 4).

A gaming device may utilize the tabular representation 500 to determine whether a payout should be output to a player as a result of an outcome generated for a game play by a random number generator of the gaming device (or otherwise obtained for the game play). For example, after determining the outcome to output on the gaming device (utilizing, e.g., tabular representation 400), the gaming device may access tabular representation 500 to determine whether the outcome for output is one of the outcomes stored as corresponding to a payout. If it is, the gaming device provides the corresponding payout to the player.

In some gaming devices, the data in tabular representation 400 and tabular representation 500 may be combined and stored in a single table. For example, the payout (even if it is zero) that corresponds to each outcome of the tabular representation 400 may be stored in an additional field of tabular representation 400.

Other arrangements of payout databases and probability databases are possible. For example, the book "Winning At Slot Machines" by Jim Regan (Carol Publishing Group Edition, 1997) illustrates many examples of payout and probability tables and how they may be derived. The entirety of this book is incorporated by reference herein for all purposes.

Referring now to FIGS. 6A and 6B, an exemplary tabular representation 600 illustrates an exemplary embodiment of a player database 325 (FIG. 3) that may be stored in controller 110. The tabular representation 600 of the player database includes a number of example records or entries, each defining a player who may be a member of a slot club of a casino or otherwise registered with or known to a casino or other entity. Those skilled in the art will understand that the player database may include any number of entries.

The tabular representation 600 also defines fields for each of the entries or records. The fields specify: (i) a player identifier 610 that uniquely identifies a player; (ii) a name 620 of a player; (iii) a financial account identifier 630 associated with a player, if any; (iv) an indication of comp points 640 available to a player; (v) a theoretical win/[loss] 650; (vi) an actual win/[loss] 660 for a player; (vii) a payment amount owed 670; (viii) loan identifier(s) 680; and (ix) a player rating 690.

The information in the tabular representation 600 may be created and updated, for example, based on information received from a player, a casino employee, a gaming device 120, a peripheral device 160, and/or peripheral device controller 165. For example, the information may be created when a player registers with a casino and receives a player tracking card encoded with the player identifier. The information may be subsequently updated when a player requests to update the information (e.g., when a player indicates a desire to change a financial account identifier) or when additional information is obtained about the player via the casino's interactions with the player (e.g., the lifetime theoretical win may be updated on an ongoing basis as the player plays games at a casino and the loan identifier(s) may be updated when a player accepts an offer for a loan of a number of electronic credits).

The player identifier 610 may be, for example, an alphanumeric code associated with a player who may operate a gaming device or play a table game at a casino. The player identifier 610 may be generated or selected, for example, by the controller 110 or by the player (e.g., when a player first registers with a casino). For each player, the tabular representation 600 may also store the player's name 620 (e.g., for use in outputting messages to the player). In one or more embodiments the player's name may comprise a nickname or other designation for the player that is selected by the player or the casino.

In some embodiments, the player identifier 610 may be stored on a player tracking card (for example, by means of a magnetic strip). In such embodiments, the player may be asked or required to insert the player tracking card into a gaming device before commencing game play or whenever requesting/executing a loan for electronic credits. The player may be asked to present the player tracking card in other instances as well, for example when paying for a meal at a restaurant associated with the casino. In this manner, the casino may track the spending/purchasing history of the player at the casino and use this information, for example, when determining the number of electronic credits to include in an offer for a loan.

The financial account identifier 630 (e.g., a credit card account number, a debit card account number, a checking account number, a casino financial account number, or digital payment protocol information) associated with the player. The financial account identifier 630 may be used, for example, to credit a payment to the player (e.g., wherein a benefit obtained by the player comprises a monetary amount) and/or to debit a wager amount. In some embodiments, the financial account identifier may be used to collect a payment from a player for a number of electronic credits previously provided to the player. For example, the financial account identifier may be used when the player requests that the financial account identifier be used to collect the payment and/or when the player fails to provide payment within a predetermined period of time from a time at which the electronic credits were provided to the player.

The comp points 640 stores an indication of the number of comp points that a player is currently entitled to. Comp point programs are a common method for a casino to reward players by awarding points to players as a reward for certain gambling behavior that a casino finds desirable. Although the comp points programs differ from casino to casino, in a typical comp point program a player accumulates comp points based on (i) a total amount of coins wagered, or (ii) a total amount of coins paid out. Alternatively, comp points may be awarded based on, for example, (i) the length of time or a number of game plays at a gaming device or table game; (ii) the average wager of a player; and/or (iii) for playing a particular gaming device or group of gaming devices. As the player accumulates comp points the player may exchange some or all of the comp points for goods or services specified by the comp point program. For example, a player may exchange 1000 comp points for a dinner at a casino restaurant. As the player exchanges comp points for a good or service the exchanged comp points are deducted from the player's comp point balance reflected in field 640 of tabular representation 600. In some comp point programs the rewards are defined in terms of dollar amounts rather than points. In yet other comp point programs the points are exchangeable into dollar amounts based on a schedule defined by the casino, allowing the player to convert the accumulated points into dollar amounts and then use the dollar amounts to purchase goods or services from the casino.

In one or more embodiments, a player may be allowed to pledge a number of comp points as collateral for a loan of electronic credits. In some embodiments, a player may be allowed to repay a loan of electronic credits with a number of comp points.

The theoretical win/[loss] 650 stores an indication of the theoretical win of the player based on the playing activity of the player since the playing activity of the player has been tracked. In other words, the historical theoretical win/[loss] 650 may be a “lifetime” theoretical win. In other embodiments a historical theoretical win/[loss] based on other periods of time may be stored in addition to or instead of the lifetime historical theoretical win/[loss]. For example, an annual or session theoretical win/[loss] may be stored.

The actual win/[loss] 660 stores an indication of the actual dollar amount that the corresponding player has won or lost while gambling at the casino. A loss is indicated in brackets in the tabular representation 600.

It should be understood that although a player identifier and information related to each registered player is described in detail, a player need not be registered in order to obtain benefits of the present invention (e.g., receive an offer for a loan of electronic credits and/or accept a loan of electronic credits). Accordingly, registration of a player and storing of information related to a player is not necessary for practice of the present invention.

Payment amount owed 670 stores an indication of the total amount owed by the player for loans of electronic credits previously provided to the player. Thus, the payment amount owed 670 may be increased each time a number of electronic credits is provided to a player (e.g., by being added to a credit meter balance of a gaming device or via one or more tokens representative of the number of electronic credits). The payment amount owed 670 may be decreased appropriately whenever the player repays all or a portion of the amount owed for electronic credits previously provided to the player. The payment amount owed 670 may also be decreased whenever the casino determines that all or a portion of the amount owed by a player is to be forgiven without requiring payment. The payment amount 670 may be accessed, for example, to determine whether a player owes a payment amount and the value of the payment amount owed. For example, when a player inserts a player tracking card into a gaming device, the player’s record in the player database may be accessed based on the player identifier indicated by the player tracking card. The payment amount 670 indicated in the player’s record may then be determined and, if the amount is greater than zero, a message reminding the player of the amount owed may be output to the player. The payment amount 670 may further be utilized to determine whether a loan of electronic credits should be offered to the player and/or the number of electronic credits that should be offered to the player. For example, if the payment amount 670 is above a predetermined threshold, a rule may indicate that no further loans for electronic credits should be offered to the player.

Loan identifier(s) 680 may store one or more identifiers of loans accepted by a player, irrespective of whether the player repaid a payment amount associated with the loan. In some embodiments, loan identifier(s) 680 may identify one or more loans offers output to a player, irrespective of whether the player accepted the loan offer. Each of the loan identifier(s) stored in loan identifier(s) field 680 may correspond to a record of loan database 325, described in detail below. The information in loan identifier(s) field may be utilized, for example, to retrieve corresponding records in loan database 325. The detailed information in loan database 325 may be utilized, for example, to determine whether an offer for a loan should be output to a player (e.g., based on the player’s history in repaying previous loans, as indicated in the records of loan database 325). In one or more embodiments, the information in the loan database 325 may be used to determine a number of electronic credits to be offered to a player as a loan.

Player rating 690 may comprise an indication of a value placed on the player by the casino. A player rating may indicate, for example, the typical spending range of the player, a frequency of the player’s visits to the casino, a promptness of the player in repaying loans of electronic credits, and/or other indication of how valuable the player is considered to be by the casino.

The player rating 690 may be determined, for example, based on the gambling or other spending behavior of the player. For example, the player rating may be determined based on a theoretical win/loss, actual win/loss, coin in, or average wager per game play of the player. A player rating may or may not be known to the player.

For example, a casino may utilize a rating system of “A”, “B”, “C” and “D”, where “A” indicates a very high value player, “B” indicates a somewhat high value player, “C” indicates a somewhat low value player, and “D” indicates a very low value player. Stored rules for outputting an offer for electronic credits may refer to such player ratings. For example, a rule may indicate that no offers are to be provided to a player rated as “D”, certain offers are to be provided to a player rated as “C”, while still other offers (e.g., the most generous offers) are provided to a player rated as “A”. Stored rules may also utilize the player rating 690 to determine, for example, how many electronic credits to offer to a player, terms of a loan for electronic credits, and/or whether a loan should be forgiven without requiring repayment.

Of course, other rating systems besides the one described may be used to describe a player’s value to a casino. For example, a player rating may indicate that a player is “an average player” or a “premium player”. In another example, a player rating may indicate that a player is a “new player”, “occasional player” or “frequent player”.

In another example, a player rating may be a numerical value or range of values representing various data. For example, a player rating may indicate a player’s average amount spent per gaming session. In another example, a player rating may indicate a range of electronic credits that may be provided to the player as a loan.

In one or more embodiments, a player database may store additional information relevant to determining a credit worthiness of a player. For example, the player database may store a credit report obtained from a third party credit agency (e.g., Central Credit Corp.™), an identifier of a credit report stored elsewhere, an identifier of the player enabling the third party credit agency to perform a credit report on the player, and/or information indicated on a credit report (e.g., a credit rating or other information associated with the player’s credit history). In some embodiments, information from a credit report on the player’s credit history may be incorporated into the determination of the player rating 690. Accordingly, the player rating 690 may indirectly reflect such information and the information may not be stored in the player database.

Information contained in the player database player database 325 may be collected, for example, via player registration methods that may take place electronically, for example at a gaming device 120. In other embodiments, players may register with a casino employee (such as at a slot club booth) who would, in turn, enter the information into the database.

Information contained in player database 325 may be used, for example, to contact the player regarding an outstanding payment amount owed for a loan or to access the player's credit card account to check a balance or freeze an amount of credit.

Referring now to FIG. 7, an exemplary tabular representation 700 illustrates an exemplary embodiment of a gaming session database 330 (FIG. 3) that may be stored in controller 110. The tabular representation 700 of the gaming session database includes a number of example records or entries, each defining a gaming session of a player. Those skilled in the art will understand that the gaming session database may include any number of entries.

The tabular representation 700 also defines fields for each of the entries or records. The fields specify: (i) a gaming session identifier 705 that uniquely identifies a gaming session; (ii) a gaming device identifier 710 that identifies the gaming device on which the gaming session was conducted; (iii) a date 715 on which a gaming session was conducted; (iv) a start time 720 that identifies the time at which the gaming session began; (v) an stop time 725 that indicates the time at which the gaming session ended; (vi) a player identifier 730 that identifies the player associated with the gaming session; (vi) a game identifier 735 that identifies the game(s) played during the gaming session (e.g., some gaming devices may be operable to conduct more than one game); (vii) a coin-in 740 indicating the total amount of wagers placed by the player during the gaming session; and (viii) a theoretical win/[loss] 745 that indicates the player's theoretical win for the gaming session.

A gaming session, as used herein, is a consecutive duration of game play by a player. The gaming session may be conducted on a single device or a plurality of devices. A start of a gaming session may be determined to be, for example, a time at which a player inserts a player tracking card into a gaming device that is at least a predetermined duration of time since a time at which the player removed the player tracking card from a gaming device. An end of a gaming session may be determined to be, for example, a time at which the player removed his player tracking card from a gaming device and subsequently did not insert the player tracking card into another gaming device for at least a predetermined period of time. In another embodiment, where a gaming session is defined as a consecutive number of game plays on a single device, the gaming session may be determined to start when the player inserts his player tracking card into the gaming device and to end when the player removes his player tracking card into the gaming device.

The data in gaming session database 330 may be utilized for example, to determine whether to output an offer for electronic credits to a player. Such a determination may be based directly or indirectly on the data in the gaming session database 330. For example, in one embodiment the gaming session database 330 may be searched for all records having a particular player's player identifier (e.g., all records having a date within a particular date range). The average duration of the gaming sessions, the average time between the gaming sessions, the average coin-in, and/or the average theoretical win/[loss] may then be calculated based on the retrieved records. A determination of whether to output an offer for electronic credits (and/or how many electronic credits to offer) may then be based on the results of the calculation(s). In another embodiment, a player rating may be determined based on the data in the gaming session database 330. A determination of whether to output an offer for electronic credits (and/or a determination of a number of electronic credits to offer) may then be based on the determined player rating (e.g., as it is stored in the player database 325).

In one or more embodiments the gaming session database 330 may further store an indication of whether an offer for electronic credits was output to the player during the gaming session. In such embodiments, the gaming session database 330 may further store an indication of the offer (e.g., an offer identifier) and/or an indication of whether the player accepted the offer. Such information may be utilized, for example, to subsequently determine whether an offer should be output to a player, which offer should be output to the player, and/or how many electronic credits should be output to the player.

Referring now to FIG. 8, an exemplary tabular representation 800 illustrates an exemplary embodiment of a rules database 335 (FIG. 3) that may be stored in controller 110. The tabular representation 800 of the rules database includes a number of example records or entries, each defining a rule that may be utilized for determining whether to output a corresponding offer to a player. Those skilled in the art will understand that the rules database may include any number of entries.

It should be noted that, in one or more embodiments, another rules database may be utilized to determine the number of electronic credits to offer to a player. Such a determination may be distinct from a determination of whether to output an offer for electronic credits to a player.

The tabular representation 800 also defines fields for each of the entries or records. The fields specify: (i) a rule identifier 805 that uniquely identifies a rule, (ii) a condition(s) for output that describes the condition(s) under which the corresponding offer is to be output, and (iii) an offer identifier that uniquely identifies the offer to be output if the corresponding condition(s) for output are satisfied. It should be noted that, in one or more embodiments, more than one offer identifier may correspond to condition(s) for output. In such an embodiment, each of the offers may be output to the player or a subset of the offers (e.g., a single offer) may be selected. A subset of the offers may be selected, for example, randomly or based on one or more rules for such a selection.

The rules database 335 may be utilized, for example, whether an offer for electronic credits should be output to a player. For example, the condition(s) for output stored in the database may be continuously monitored to determine whether any of them have been satisfied. It should be noted that at least some of the condition(s) for output define events, the occurrence of which causes an offer for electronic credits to be output. For example, rule "R-005" defines an event of "player actuates cash-out button". Thus, for example, a gaming device being played by a player may be monitored (or may monitor its own status) for the occurrence of such events to determine whether the player is eligible to receive an offer.

It should be noted that a particular offer may correspond to more than one rule. For example, offer "OF-004" corresponds to both rule "R-004" and rule "R-005".

It should further be noted that, although the rules illustrated in FIG. 8 each pertain to information associated with the player for whom an offer for a loan is being considered, rules for determining whether to output an offer for a loan may pertain to other types of considerations. For example, a rule may consider information associated with the gaming device at which the offer is to be output (e.g., the coin inventory of the gaming device, the frequency with which the gaming device has been played within a particular period of time). In another example, a rule may consider information associated with another gaming device (e.g., the popularity of nearby gaming devices, how many nearby devices are currently being played). In another example, a rule may consider information associated with a performance of the casino in general (e.g., the revenue realized by the casino or by gaming devices of the casino within a predetermined period of time, the amount in outstanding loans owed to the casino, the business of the casino floor at the current time). In yet another example, a rule may consider information associated with one or more players associated with the player to whom the offer is to be output (e.g., whether the wife of the player is currently playing at a gaming device).

In one or more embodiments, a condition(s) for output may correspond to all offers available for output. For example, it may be desirable that no offers for any loan should be output to any player if the total amount owed to the casino in outstanding loans is greater than a predetermined amount.

Referring now to FIG. 9, an exemplary tabular representation 900 illustrates an exemplary embodiment of available offers database 340 (FIG. 3) that may be stored in controller 110. The tabular representation 900 of the available offers database includes a number of example records or entries, each defining an offer for a loan of electronic credits that may be output to a player. Those skilled in the art will understand that the available offers database may include any number of entries.

The tabular representation 900 also defines fields for each of the entries or records. The fields specify: (i) an offer identifier 905 that uniquely identifies an offer for a loan of electronic credits, (ii) offer content 910 that indicates the content of the offer, (iii) a first term 915 of the loan defined by the offer, and (iv) an nth term 920 of the loan defined by the offer. It should be understood that any number of terms may be associated with a loan. It should further be understood that the terms may be stored in a single field. It should yet further be understood that, in some embodiments, the terms of a loan may be negotiable with a player and/or customized based on information associated with the player.

Referring now to FIG. 10, an exemplary tabular representation 1000 illustrates an exemplary embodiment of loans database 345 (FIG. 3) that may be stored in controller 110. The tabular representation 1000 of the available offers database includes a number of example records or entries, each defining a loan of electronic credits that has been accepted by a player. Those skilled in the art will understand that the loans database may include any number of entries.

The tabular representation 1000 also defines fields for each of the entries or records. The fields specify: (i) a loan identifier 1005 that uniquely identifies a loan; (ii) an offer identifier 1010 that identifies the offer that resulted in the loan; (iii) one or more loan term(s) 1015 accepted by the player who accepted the loan; (iv) the time output 1020 that indicates the time at which the offer that resulted in the loan was output; (v) the time accepted 1025 that indicates the time at which the offer that resulted in the loan was accepted by a player; (vi) the time repaid 1030 that indicates the time at which the loan was repaid; and (vii) the outstanding loan amount 1035 that indicates a payment amount that the player still owes for the loan. It should be noted that the time repaid 1030 may stored more than one time. For example, a player may be allowed to repay a loan in more than one installment. In such an embodiment, the time each installment was paid may be stored in field 1030. Alternately, the time at which the last installment was paid may be stored in field 1030. It should further be noted that the term(s) of a loan as stored in field 1015 may be a term negotiated by the player upon accepting the loan. An example of a term of a loan is that the player is not eligible to earn comp points on wagers placed using electronic credits loaned to the player.

The information in the loan database 345 may be utilized, for example, to determine whether an offer for a loan of electronic credits should be output to the player and/or the number of electronic credits to be offered to the player. For example, one or more condition(s) for output 910 in the embodiment 900 of the rules database 340 may specify that an offer may be output to a player if the player has no more than two loans with associated outstanding loan amounts greater than zero. In another example, a condition(s) for output may specify that an offer may be output to a player only if the total of outstanding loan amounts associated with a player is not greater than a predetermined amount. In yet another example, a condition(s) for output may specify that an offer may be output to a player only if the total of all outstanding loan amounts for a casino are not greater than a predetermined amount.

In one or more embodiments, a determination of whether to output an offer for a loan may comprise determining the player's credit worthiness. The player's credit worthiness may be based at least in part on the player's history of repaying loans to the casino. For example, it may be determined based on the information in the loan database whether the player has satisfied the term(s) of a loan accepted by the player (e.g., by repaying a loan within an allotted period of time) and/or whether an average duration between a time the player accepts an offer for a loan and a time the player repays the loan is less than a predetermined duration.

In one or more embodiments, the outstanding loan amount field 1035 may be totaled for all loans associated with a particular player to determine the payment amount owed 670 for tabular representation 600. Alternately, payment amount owed 670 may not be stored in tabular representation 600. Rather, the loan database may be accessed and the total of all outstanding loan amounts may be determined whenever this information becomes relevant (e.g., when it is being determined, for purposes of reminding the player of any money the player may owe to the casino, whether the player owes any money to the casino).

D. Processes

Example processes of embodiments of the present invention will now be described. It should be understood that all processes described herein, unless expressly specified otherwise, may be performed, for example, by a controller 110, gaming device 120, a peripheral device 160, peripheral device controller 165, another computing device or a combination thereof. Each of these devices is described in detail above. Additionally, while some of the steps of a process may be performed by a first device, other steps may be performed by another device or a combination of devices. Further, all processes described herein, unless expressly specified otherwise, may include steps in addition to those expressly depicted in the Figures or described in the specification without departing from the spirit and scope of the present invention. Similarly, the steps of the processes described herein, unless expressly specified otherwise, may be performed in an order other than depicted in the Figures or described in the specification, as appropriate.

Figure 11:
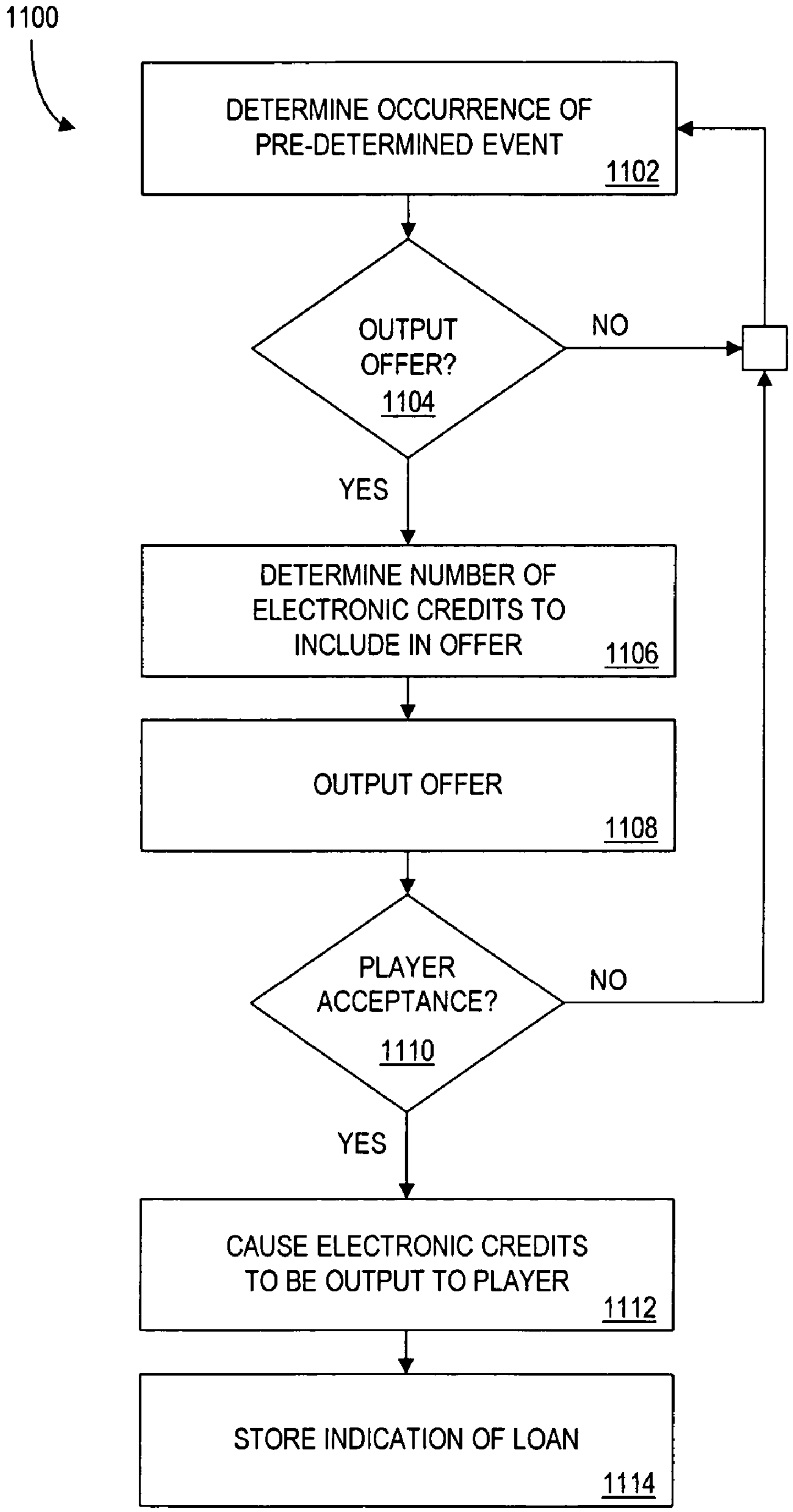
FIG. 11 is a flow diagram illustrating an exemplary process for outputting an offer to a player.

Referring now to FIG. 11, a flowchart illustrates a process 1100 that is consistent with one or more embodiments of the present invention. The process 1100 is a method for outputting an offer for a loan of electronic credits.

In step 1102, an event that triggers a determination of whether to output an offer for a loan of electronic credits to a player is determined. For example, in one or more embodiments a plurality of predetermined events may be stored in memory. A program may store a subroutine for determining whether to output an offer for a loan. The subroutine may be initiated whenever one or more of the predetermined events is determined.

In embodiments in which step 1102 is performed by a controller 110, peripheral device 160 and/or peripheral device controller 165, the determination of a predetermined event may comprise, for example, periodically or substantially continuously querying one or more gaming devices (or other devices relevant to the predetermined event) to determine whether the predetermined event has occurred at the one or more gaming devices (or other devices). Alternately, the determination of an occurrence of a predetermined event may comprise receiving a signal from one or more gaming devices (or other devices), the signal conveying the occurrence of the predetermined event.

In embodiments where the step 1102 is performed by a gaming device, the determination of an occurrence of a predetermined event may comprise the gaming device monitoring, periodically or substantially continuously, its own status to determine the occurrence of the predetermined event. Alternatively, if the predetermined event is related to an occurrence of an event at one or more devices other than the gaming device, the determination of the occurrence of the predetermined event may comprise the gaming device querying the one or more devices, or receiving a signal therefrom.

Events that may trigger the determination of whether an offer for a loan of electronic credits should be output to a player may be associated with, for example, at least one of a player, a gaming device, and a casino.

Examples of events associated with a player include a player performing one or more of the following actions: (i) actuating a cash-out button of a gaming device; (ii) actuating a button for requesting a loan of electronic credits (e.g., a button of a gaming device 120 or a button of a terminal 130); (iii) indicating a wager which cannot be met by the current balance of the credit meter; (iv) indicating a wager which, if lost, will result in a credit meter balance of zero or within a predetermined range of zero; (v) inserting money into a coin/bill acceptor of a gaming device; (vi) inserting or removing a player tracking card from a gaming device; (vii) placing a wager which, if lost, would result in a zero (or near zero) credit balance; and (viii) not qualifying for a bonus round of a game during a predetermined duration of time spent playing the game.

Another example of an event associated with a player includes an occurrence of an event associated with a friend or relative of a player. For example, if a wife of a player has just won a payout of a predetermined magnitude and the player's credit meter balance is below a threshold amount, this may trigger the determination of whether an offer for a loan should be output to a player. In such embodiments, players associated with a subject player may be associated in the player database (e.g., the player identifiers of the related players may be stored in the subject player's record).

Examples of events associated with a gaming device include: (i) a credit meter balance of a gaming device equaling zero or an amount within a predetermined range of zero; (ii) a credit meter balance of a gaming device equaling an amount less than a minimum (or maximum) wager playable on the gaming device; (iii) a gaming device outputting a predetermined number of losing outcomes (e.g., consecutively or within a predetermined period of time); (iv) a total amount of payouts won on a gaming device during a predetermined period of time being less than a predetermined amount; (v) all electronic credits associated with a recently inserted bill being lost (e.g. the player lost the $20 bill he just inserted, although he still has some credits left from previous coins inserted); (vi) a payout percentage of a gaming device within a predetermined period of time being less than a predetermined threshold percentage (e.g., the gaming device has paid out less than 50% of coin-in during the last hour); (vii) an occurrence of a predetermined period of time (e.g., every hour on the hour, or twenty minutes after the start of a gaming session, the gaming device is to output an offer for a loan); and (viii) the occurrence of a condition at another gaming device nearby to the subject gaming device (e.g., a nearby gaming device has just output a payout at least equal to a predetermined threshold, a nearby gaming device has not been played for a predetermined period of time).

Examples of events associated with a casino include: (i) an amount of revenue realized by the casino within a predetermined period of time; (ii) a number of gaming devices currently being played in the casino or a particular area of the casino; (iii) a number of guests currently staying in a hotel of the casino; (iv) a number of outstanding loans owed to the casino; (v) a total of outstanding loan amounts owed to the casino; and (vi) an amount of profit realized by gaming devices of the casino within a predetermined period of time.

Other types of events may also trigger the determination of whether an offer for a loan of electronic credits should be output to the player. For example, an occurrence of a predetermined time (of day, week, month, or year) or an occurrence of an event external to the casino environment (e.g., an adjustment of interest rates, a temperature outside the casino, weather conditions outside the casino) may trigger such a determination.

In step 1104, it is determined whether an offer for a loan of electronic credits should be output to a particular player. For example, just because an event associated with the player, gaming device being played by the player, and/or casino in which the player is playing triggered a determination of an offer for a loan does not imply that the player is eligible to receive a loan. Accordingly, it may be determined whether the player is eligible to receive an offer for a loan. This determination may be based on information associated with one or more of the player, the gaming device, other gaming devices and/or other sources of information associated with the operation of the casino. Examples of information that may be used to determine whether to offer a loan of electronic credits to a player are described below.

In one or more embodiments, a determination of a player's eligibility to receive an offer for a loan of electronic credits may be based on an amount of money won or lost by the player over a certain time period or number of games played. For example, the player may be required to lose at least $100 within 24 hours at the gaming device before becoming eligible to receive an offer for a loan. In another example, the player may be required to have won at least $50 within the last week at the casino in order to receive an offer for a loan. In one or more embodiments, the gaming session database 330 and/or the player database 325 may be accessed to determine this type of information.

In one or more embodiments, a determination of a player's eligibility to receive an offer for a loan of electronic credits may be based on the coin-in and/or coin-out of the gaming device being played by the player. For example, an offer for a loan may only be provided to a player who has wagered more than $500 during a gaming session and/or the player has won less than $100 in payouts over the last hour and/or during a gaming session. In one or more embodiments, the gaming session database 330 and/or the player database 325 may be accessed to determine this type of information.

In one or more embodiments, a determination of a player's eligibility to receive an offer for a loan of electronic credits may be based on the credit history of the player. The credit history may comprise the player's credit history with the casino (e.g., the player's track record in repaying previously accepted loans) and/or the player's credit history as indicated by a third party credit agency (e.g., based on the player's repayment of credit and/or loans to other parties). For example, the player may be required to undergo a credit check and score above or below a threshold score in order to be eligible to receive an offer for a loan of electronic credits. The player database 325 and/or the loan database 345 may be accessed to determine this type of information.

In one or more embodiments, a determination of a player's eligibility to receive an offer for a loan of electronic credits may be based on whether the player has a valid credit card number (or other financial account identifier) on record with the casino. For example, in some embodiments a request for a freeze to be put on a portion of the line of credit associated with a credit card may be communicated to the issuing bank of the credit card before a player is provided with an offer for a loan. In other embodiments, a prerequisite of outputting an offer for a loan to a player may be that a sufficient amount of funds to repay the loan is available from the financial account associated with the player (e.g., the credit card associated with the player has sufficient available credit to cover the loan amount). The player database 325 may be accessed to determine this type of information.

In one or more embodiments, a determination of a player's eligibility to receive an offer for a loan of electronic credits may be based on whether valid contact information is available for the player. For example, the player may be required to provide a driver's license when signing up for a player tracking card, with the address stored in the player database 325. In this manner the casino may be better assured of a means of following up with the player in the event the player fails to repay a loan. If the casino does not have contact information for the player, the player to provide the contact information (e.g., via the gaming device being played by the player) before an offer is output to the player or before the player is allowed to accept the offer. The player database 325 may be accessed to determine this type of information.

In one or more embodiments, a determination of the player's eligibility to receive an offer for a loan of electronic credits may be based on a rating of the player. A player rating may be an indication of a player's value to a casino. As such, a player rating may be, e.g., a measure of past game play within the casino (e.g., based on a lifetime theoretical win of the player or an average theoretical win per trip for the player). Players that are considered highly valuable (or highly profitable) may be more likely to receive offers for loans and/or a may be eligible to receive a larger amount of electronic credits in a single loan or over an aggregate of loans. The player database 325 may be accessed to determine the player rating.

In one or more embodiments, a determination of the player's eligibility to receive an offer for a loan of electronic credits may be based on the player's current and/or past status as a guest of a hotel associated with the casino. For example, the length of the player's hotel stay and/or the number of previous hotel stays with the hotel may be considered in determining whether to provide an offer for electronic credit. For example, the player may be required to currently be registered for two more nights stay in the hotel in order to receive an offer for electronic credit. A hotel registry database (not illustrated herein) may be accessed to determine this information. Alternately, this information may be stored in the player database 325.

In one or more embodiments, a determination of the player's eligibility to receive an offer for a loan of electronic credits may be based on the total amount of money spent by the player at other casino/hotel activities. For example, the player may be required to have spent at least $100 at the casino gourmet room or $50 at the spa in order to qualify for an offer for a loan. In another example, the player must have a current reservation for two or more tickets to a show in an establishment associated with the casino in order to qualify for an offer of a loan.

In one or more embodiments, a determination of whether a player is eligible to receive an offer for a loan of electronic credits may be based on whether a player has applied for eligibility to receive such an offer. For example, a player may be required to apply eligibility to receive offers for loans of electronic credits prior to the casino visit, game play, etc. For example, the player may apply for eligibility online at home, prior to visiting the casino. In another embodiment, the player may indicate whether he wants to be considered for offers of loans when he first signs up for a player tracking card.

In one or more embodiments, a determination of whether to output an offer for a loan may be based on considerations not directly related to the player to whom the offer is to be output. For example, it may be undesirable to output any offers for loans if the outstanding loan debt of the gaming device or casino is greater than a predetermined amount. For example, the casino may only desire to have outstanding a total of no more than $5,000 in loans to players of gaming devices at any given time.

In another example, a casino may find it desirable to output offers for loans only when overall casino performance exceeds a certain threshold level. For example, the casino may chose only to provide offers when $200,000 is wagered by slot machine players per hour, or whenever gaming devices in aggregate have been holding more than their theoretical hold for the last hour. Alternatively, the casino may only provide offers for loans when casino performance falls short of a given threshold. A variety of methods for assessing casino performance are known in the art.

In one or more embodiments, a determination of a player's eligibility to receive an offer for a loan of electronic credits may comprise determining whether a player is playing at a gaming device of a predetermined designation. For example, a casino may designate one or more gaming devices as gaming device that, if played by a player, may allow the player to receive an offer for a loan. These may be gaming devices that, for example, are operable to perform one or more of the methods described herein. For example, a designation of a gaming device for output of offers may be based on a manufacturer, denomination, or other characteristic of the gaming device.

It should be noted that a combination of any of the above considerations may be included in a determination of whether to output an offer for a loan of electronic credits to a player.

If it is determined at step 1104 that an offer for a loan is to be provided to a player, the process 1100 continues to step 1106. Otherwise, the process 1100 returns to step 1104 or simply ends until it is triggered again. It should be noted that in embodiments where the predetermined event that triggered the process 1100 comprised a request from a player for a loan, the process 1100 may include a step of outputting a message to the player informing the player that he or she is not eligible to receive an offer for a loan.

In one or more embodiments, steps 1102 and 1104 may be combined such that determining a player's eligibility for a loan comprises determining whether a predetermined event has occurred or whether a condition for outputting an offer has been satisfied. Thus, for example, the gaming device may periodically (or, e.g., substantially continuously) check the player's eligibility for an offer of a loan. For example, a player may initiate game play on a gaming device, and it may be determined that the player is not eligible to receive an offer for a loan at that time. However, thirty minutes later the player's eligibility may be evaluated again, as information associated with the player, casino, etc. may have changed within the thirty minutes. Alternatively, the player's eligibility may be re-evaluated when a signal indicating the occurrence, or potential occurrence, of a predetermined event is received.

In one or more embodiments, the process 1100 may continue from step 1102 directly to step 1106. In such embodiments, it may effectively be determined that a player is not eligible to receive an offer for a loan of electronic credits if the result of the determination in step 1106 is that the number of electronic credits to be offered to the player is zero.

In step 1106 the number of electronic credits to be included in the offer to be output to the player are determined. This determination may be based on a variety of information associated with at least one of the player, the gaming device and/or other gaming devices. For example, any and all of the considerations described with reference to step 1104 may be considered in determining the number of electronic credits to offer to a player. For example, a number of electronic credits may be determined at least in part based on a player rating associated with the player to whom the offer is to be output (e.g., if the player rating is a first rating, a first number of electronic credits is to be offered but if the player rating is a second rating, a second number of electronic credits is to be offered). For instance, a casino may find it desirable to offer a relatively larger number of electronic credits to players with certain player ratings (e.g., player ratings indicating a high value player).

In one or more embodiments, a value score may be determined and associated with a player based on one or more of the considerations described with reference to step 1104. The number of electronic credits offered to the player may be based on this value score.

In some embodiments, the casino may only offer one number of electronic credits (e.g., twenty electronic credits or a number of electronic credits sufficient to place a predetermined number of maximum wagers on the gaming device being played by the player). In these embodiments, steps 1104 and 1106 may be combined, such that the determination of whether to output an offer for a loan inherently involves determining the number of electronic credits to offer to the player. Similarly, the casino may potentially only offer certain fixed numbers of electronic credits (e.g., twenty, fifty and one hundred electronic credits or the number of electronic credits sufficient to place five, ten or twenty maximum wagers on the gaming device being played by the player). In these embodiments, step 1106 may comprise determining which of the possible numbers of electronic credits the player is eligible for, if any. For example, a player may offer a first number of electronic credits the first time an offer for a loan is output to a player, a second (higher) number of electronic credits the second time an offer for a loan is output to a player (provided the player accepted and successfully repaid the first loan), and a third (highest) number of electronic credits the third and any subsequent time an offer for a loan is output to the player (provided the player accepted and successfully repaid the first two loans). Similarly, a casino may offer a first number of credits if a player's gambling history satisfies a first criterium, a second number of credits if the player's gambling history satisfies a second criterium.

In one or more embodiments, a plurality of offers may be available, each of the available offers defining a particular number of electronic credits. In such embodiments, either step 1104 or step 1106 (or a combination thereof) may comprise determining which of the available offers to output to a player, thus inherently determining the number of electronic credits to offer to a player. For example, the available offers database 340 (e.g., as illustrated in tabular representation 900 of FIG. 9) may be accessed and one or more of the offers stored in the database may be selected (e.g., based on which of the condition(s) for output have been satisfied).

In some embodiments, the player may request a loan for a specific number of electronic credits. In these embodiments, step 1106 may comprise whether the player will be approved to receive the requested number of electronic credits. This may comprise, for example, determining a maximum number of electronic credits that the player is eligible for and comparing this number to the requested number of electronic credits. If the determined maximum number is greater than or equal to the requested number, the player may be approved for the number of electronic credits requested. If the determined maximum number is less than the number of electronic credits requested by the player, a counter-offer of the maximum number of electronic credits may be output to the player.

In one or more embodiments, the number of electronic credits to be included in an offer for a loan may be based in part on the game being played by the player. For example, the casino may determine that it is beneficial to provide the player with a greater number of electronic credits for use on a game with higher house edge, a game that currently has low usage, etc. Further, the number of electronic credits may be based on the number of credits typically required to initiate game play. For example, a player may be offered $25 (or some other multiple of five) in electronic credits for use on a $5 slot machine (i.e., a slot machine in which each credit is worth $5). Thus, in this example, the player may be provided with five credits.

In one or more embodiments, the number of electronic credits to be included in an offer for a loan may be based on loans of electronic credits previously provided to a player. For example, a player might be first offered $10 in electronic credits, and then subsequently offered $20 in electronic credits if the first loan had been repaid in conformance with any terms of the loan.

In one or more embodiments, a number of electronic credits may be determined based on one or more rules stored in a memory. The following table illustrates some rules for determining a number of electronic credits to be offered to a player. It should be noted that the rules refer to the considerations described with respect to step 1104 as well as additional considerations.

TABLE 1

Rules for Determining Number of Electronic Credits to Offer

| Rule | Amount in Electronic Credits |
|---|---|
| IF player rating is "A" or "B" AND gaming device is class "3" device AND payment amount owed is less than $50 | $25 |
| IF player rating is "C" AND player has not accepted a loan before | $10 |
| IF player is casino hotel guest AND total of Outstanding Loan Amounts is <$100,000 | $20 |
| IF gaming device activity is below threshold AND (player has actuated cashout button OR removed player tracking card) AND contact information available for player | Sufficient to play 10 game plays at maximum wager |

TABLE 1-continued

| Rules for Determining Number of Electronic Credits to Offer | |
|---|---|
| Rule | Amount in Electronic Credits |
| IF gaming device is class "4" AND nearby gaming devices are not being used | Sufficient to play for 15 minutes |

As illustrated in Table 1 above, a rule may specify one or more conditions that must be met in order for the corresponding amount in electronic credits to be selected. As also illustrated in Table 1 above, a rule may specify a monetary amount or other type of value (e.g., number of games, duration of time) that may be converted to a number of electronic credits.

For example, if a rules specifies an amount of electronic credits equal to $20, step 1106 may comprise determining the denomination of the gaming machine being played by the player and converting the $20 into the appropriate number of electronic credits. For example, if the player is playing a $1 gaming device, $20 would be translated into twenty electronic credits.

In another example, if a rule specifies an amount of electronic credits sufficient to play ten games at maximum wager at the gaming device being played by the player, step 1106 may comprise determining the maximum wager of the gaming device and multiplying this by ten. For example, if the player is playing a gaming device at which the maximum wager is three credits, this would mean the player is to be offered thirty electronic credits.

In yet another example, if a rule specifies an amount of electronic credits sufficient for a player to continue play the gaming device being played by the player for an additional fifteen minutes, step 1106 may comprise (i) determining a number of game plays playable on the gaming device per minute (e.g., based on the programmed duration of time each game play at the gaming device), (ii) multiplying this number by fifteen, (iii) determining a number of electronic credits necessary to initiate a game play; and (iv) multiplying the number of (ii) by the number of (iii). It should be noted that, in one or more embodiments, a gaming device may store the information required for this determination or such information for a plurality of gaming devices may be stored in a Gaming Device Database (e.g., which may be stored in controller 110 or peripheral device controller 165).

In one or more embodiments, more than one rule may be satisfied by a particular set of conditions. For example, a particular set of conditions applicable to a determination of a number of electronic credits to offer to a player may satisfy both a rule corresponding to a loan of twenty electronic credits and a rule corresponding to a loan of thirty electronic credits. In such a scenario, it may be determined that the higher number of electronic credits should be selected. Alternatively, it may be determined that the lower number of electronic credits should be selected.

In one or more embodiments, rather than selecting a number of electronic credits based on a rule, a number of electronic credits may be calculated by adding a predetermined number of electronic credits for each condition that is satisfied. For example, a number of electronic credits may be calculated as follows:

ADD five electronic credits IF player rating is "A";

ADD two electronic credits IF player rating is "B";

ADD one electronic credit for each loan previously repaid by the player on time;

ADD five electronic credits IF credit score of player is above predetermined threshold;

ADD five electronic credits IF activity of casino is below predetermined threshold; and SUBTRACT two electronic credits for each outstanding loan associated with player.

In the above embodiment, the calculation may involve comparing the resultant number of electronic credits to a maximum number (which may be, e.g., determined based on information associated with a player) and, if the calculated number of electronic credits exceeds the maximum number, the maximum number of electronic credits may be selected for inclusion in the offer.

Also in the above embodiment, the calculation may involve determining a number of electronic credits required for initiating a game play on the gaming device being played by the player and rounding the calculated number of electronic credits (either up or down, depending on the desire of the casino or other entity practicing the present invention) to be a number that is a multiple of the number required for initiating the game play.

In one or more embodiments the method of calculating a number of electronic credits by adding, subtracting, multiplying or dividing may be combined with the method of determining a number of electronic credits based on a rule. For example, a rule may specify a base amount of electronic credits that is then increased or reduced based on one or more additional rules.

In some embodiments, the number of electronic credits offered to a player may be based on an amount of collateral provided by the player or available to the player. For example, the player may provide a number of table chips as collateral for electronic credits on a gaming device. These chips could be placed into a secure receptacle with the gaming device itself, or provided to a casino employee for safekeeping. Alternatively, the player could show the chips to a camera or reader device associated with the gaming device, for determination of a rough or exact value of the chips.

In another example, the player may be allowed to pledge a number of comp points earned as collateral for a loan. For example, as collateral for a $10 loan, the player might be required to pledge 500 comp points. Should the player not pay off the loan within 24 hours, 500 comp points would be deducted from the player's account (e.g. the balance of a comp point account associated with the player database would be decremented by 500). In this embodiment, the 500 comp points could be frozen while the loan is outstanding, preventing the player from using those comp points before paying off the loan.

In one embodiment, a first player may be allowed to use a current credit meter balance of a second player as collateral (provided the second player agrees). For example, a husband may pledge his wife's credit meter balance as collateral for his loan. In one embodiment, the credit meter balance serving as collateral for a loan may not be allowed to be cashed out until the loan is repaid. For example, the credit meter balance amount may be allowed to be transferred from one gaming device to another or stored in association with a player's account but not cashed out by the player until the loan is repaid or another source of collateral provided. In yet another example, a player's hotel room may be used as collateral. For example, if the loan is not repaid by a predetermined time, the player may be required to check out of the hotel room and/or be downgraded to a hotel room of a lesser value/desirability.

It should be understood that, in some embodiments, step 1106 may comprise determining a dollar amount to be offered to a player (e.g., $10). In such embodiments, step 1106 may further comprise translating the monetary amount to a number of electronic credits.

Many other methods of determining a number of electronic credits to offer to a player as a loan may be understood by one of ordinary skill in the art upon reading the present disclosure.

Returning now to FIG. 11, once the number of electronic credits are determined, the process 1000 continues to step 1108, where the offer for the loan of electronic credits is output. Outputting an offer for a loan may comprise, for example, outputting at least one of audio and visual information to a player. For example, outputting an offer may comprise outputting text describing the offer via a display device of the gaming device being played by the player. In other embodiments, an offer may be output via an output device of a peripheral device associated with the gaming device being played by the player or a user device associated with the player. In embodiments where a file of audio, text or other visual information is stored in memory, step 1108 may comprise retrieving the filed.

In one example, an offer for a loan may be output to a player via a display screen of a gaming device. For example, a secondary display screen (e.g., one used to output messages and/or bonus round information to a player) may display a text box indicating the loan offer, including the number of electronic credits being offered and any other terms of the loan. In another example, an offer for a loan may be output to a player via an LED screen (e.g., such as one typically associated with a player tracking card device of a gaming device).

In another example, an offer for a loan may be output to a player via a printer of a gaming device. For example, an indication of an offer may be printed on a paper output to the player (e.g., in the form of a coupon, voucher, or receipt). In one or more embodiments, the paper may include a bar code or other device-readable indicia that is recognizable by, e.g., a gaming device or peripheral device as representing the number of electronic credits offered to the player. In such an example, to accept the offer the player merely need use the paper at a gaming device (e.g., by inserting the paper into the gaming device, scanning the bar code of the paper with a bar code scanner of a gaming device, or inputting a code printed on the paper into a gaming device). In other embodiments, the offer for the loan may be output via a display device and the paper may be printed only if the player accepts the offer.

In one or more embodiments, a player may be provided with more than one offer for a loan. For example, if the player is eligible for a maximum of $100 in electronic credits, the player may be presented with an offer for $100 in electronic credits, an offer for $50 in electronic credits and an offer for $20 in electronic credits, from which selection the player may choose one offer.

In step 1110 it is determined whether the player has accepted the offer output in step 1108. A player's acceptance may be received via a variety of input mechanisms for gaming devices are well known in the art. For example, the player may accept the offer through input device 237 or by pressing an acceptance button labeled on a touch screen or console of the gaming device.

The player may accept the offer using an input device of the gaming device. For example, the player may actuate a particular key on a keypad of the gaming device or touch a designated area of a touch-screen. In another example, the player may speak an acceptance of the offer, the speech being recognized by a microphone device of the gaming device.

In embodiments where the offer is output by being printed on a paper or other substrate, the player may accept the offer by using the paper or other substrate. For example, the printed offer may have a bar code printed in associated therewith. The player may accept the offer by causing the bar code to be scanned by a bar code scanner of a gaming device. In another example, the printed offer may have a code printed in association therewith. The player may accept the offer by inputting the code into a gaming device (e.g., by actuating keys of a keypad or areas of a touch-screen corresponding to the code).

In some embodiments, the offer for a loan of electronic credits may be associated with a time by which an acceptance of the offer need by received, such that the player has a limited amount of time to accept the offer. For example, the time for acceptance may be one minute from the time the offer is output, such that the player must decide whether to accept the offer within the minute. In another example, the time for acceptance may be two hours from the time the offer is output, such that the player may consider the offer for a longer period of time before determining whether to accept. The time for acceptance may expire based on criteria other than the passage of time. For example, in one or more embodiments, the time for acceptance may end after a predetermined number of game plays are played by the player subsequent to the offer being output, when the player removes his player tracking card, etc. In embodiments where a player has a limited time within which to accept an offer for a loan, step 110 may additionally comprise determining whether the player's acceptance has been received within the time for acceptance defined by the offer.

In one or more embodiments, the player may be able to access (and accept) the offer from another gaming device 120 (different from the gaming device 120 being played by the player at the time the offer is output), from a terminal 130, or from another peripheral device (different from any peripheral device 160 that may be associated with the gaming device 120 being played by the player at the time the offer is output to the player). Thus, the player may not be required to stay at the gaming device at which the offer was output in order to accept the offer.

In one or more embodiments, the player's identity may be verified at the time of acceptance. For example, a player may be asked to input a password, answer a question only the player for whom the offer was intended would know the answer to, or insert a player tracking card (if one is not already inserted into the gaming device or peripheral device).

In one or more embodiments, the player may be required to provide an electronic signature as an acceptance of the loan. Such a signature may be, for example, compared to a signature of the player stored on record with the casino (e.g., before the player's acceptance is finalized and/or if the player subsequently disputes having accepted the loan).

In one or more embodiments, a player might be required to allow his photo to be taken upon acceptance of an offer for a loan. Although this does not assure repayment, some players may feel more committed to repayment of loans when they know that a picture of them is on file.

Once a player's acceptance of an offer for a loan is received, the electronic credits are output to the player in step 1112. Outputting the electronic credits may comprise, for example, causing a credit meter balance of the gaming device being played by the player to be increased by the number of electronic credits defined by the offer accepted by the player. For example, if step 1112 is being performed by the gaming device, step 1112 may comprise initiating a subroutine for adjusting the credit meter balance by the number of electronic credits. In another example, if step 1112 is being performed by a peripheral device, step 1112 may comprise the peripheral device directing the gaming device to increase the credit meter balance by the number of electronic credits.

As described above, in one or more embodiments providing the electronic credits to the player may comprise outputting one or more tokens representing the electronic credits to be output to a player. For example, step 1112 may comprise the gaming device or a peripheral device associated with the gaming device dispensing one or more of coins, bills, casino tokens, a cashless gaming receipt, and a magnetic stripe card to the player. For example, the electronic credits may be provided to the player by dispensing, into a coins tray of a gaming device or a peripheral device, a number of coins equal to the value of the electronic credits defined in the accepted offer.

It should be noted that, in one or more embodiments, once the loaned electronic credits are added to a credit meter balance of a gaming device (whether they are added directly or by the player using the one or more tokens representing the electronic credits at the gaming device) the player may not be allowed to cash out the electronic credits provided as a result of the loan for a predetermined period of time and/or a predetermined number of game plays. For example, such a limitation may be a term of the loan. For example, a cash-out button of the gaming device may be disabled for the duration of the predetermined period of time or the predetermined number of game plays. A casino may adopt such a rule to make sure that the loaned electronic credits are used only for game play. Alternately, instead of preventing players from cashing out the electronic credits, the players may be allowed to cash out the electronic credits in the form of special tokens which have reduced value.

In one or more embodiments, the loaned electronic credits may only be usable at the gaming device the player was playing at the time of the output and/or acceptance of the offer for the loan. Alternatively, the player may be able to use some or all of the electronic credits at another gaming device (e.g., by having the electronic credits transferred via controller 110 from one gaming device to another). This may be advantageous even if the casino restricts the player from cashing out electronic credits, since the player may still use the electronic credits only for game play, albeit on multiple gaming devices. For example, in one embodiment, loan database 345 may include a field that stored information indicating an amount of electronic credits as yet unused by the player of an outstanding loan.

It should be noted that, in one or more embodiments, a player may be allowed to use electronic credits received as a result of a loan on expenditures at the casino/hotel other than game play. For example, the player may be allowed to use all or some of the electronic credits on a meal in a participating restaurant, on a show ticket, etc. In this manner, the casino may better control how the player uses the electronic credits.

In one or more embodiments, one or more restrictions may be placed on the usage of electronic credits received from an acceptance of an offer for a loan. As described, a player may be prevented from cashing out the electronic credits or from using the electronic credits in certain gaming devices (e.g., any device other than the one at which the offer was output and/or accepted). Other examples of restrictions on the usage of the electronic credits include: (i) preventing the player from wagering all of the credits on one wager (or within a predetermined minimum number of wagers); (ii) preventing the player from wagering more than a maximum number of electronic credits (e.g., five) for every predetermined duration of time (e.g., every minute).

In embodiments where restrictions are placed on the usage of electronic credits provided as a result of an accepted loan offer, the electronic credits may be accounted for in a credit meter balance distinct from a credit meter balance into which a player's winnings or electronic credits from other sources are accounted.

In step 1114, an indication of the loan is stored in the loan database 345. For example, a new record may be created in the loan database 345, a unique loan identifier generated or assigned, and the amount of the loan as well as the terms of the loan may be stored in the record. Additionally, the player may be provided a receipt for the loan, to document the player's debt to the casino.

Figure 12:
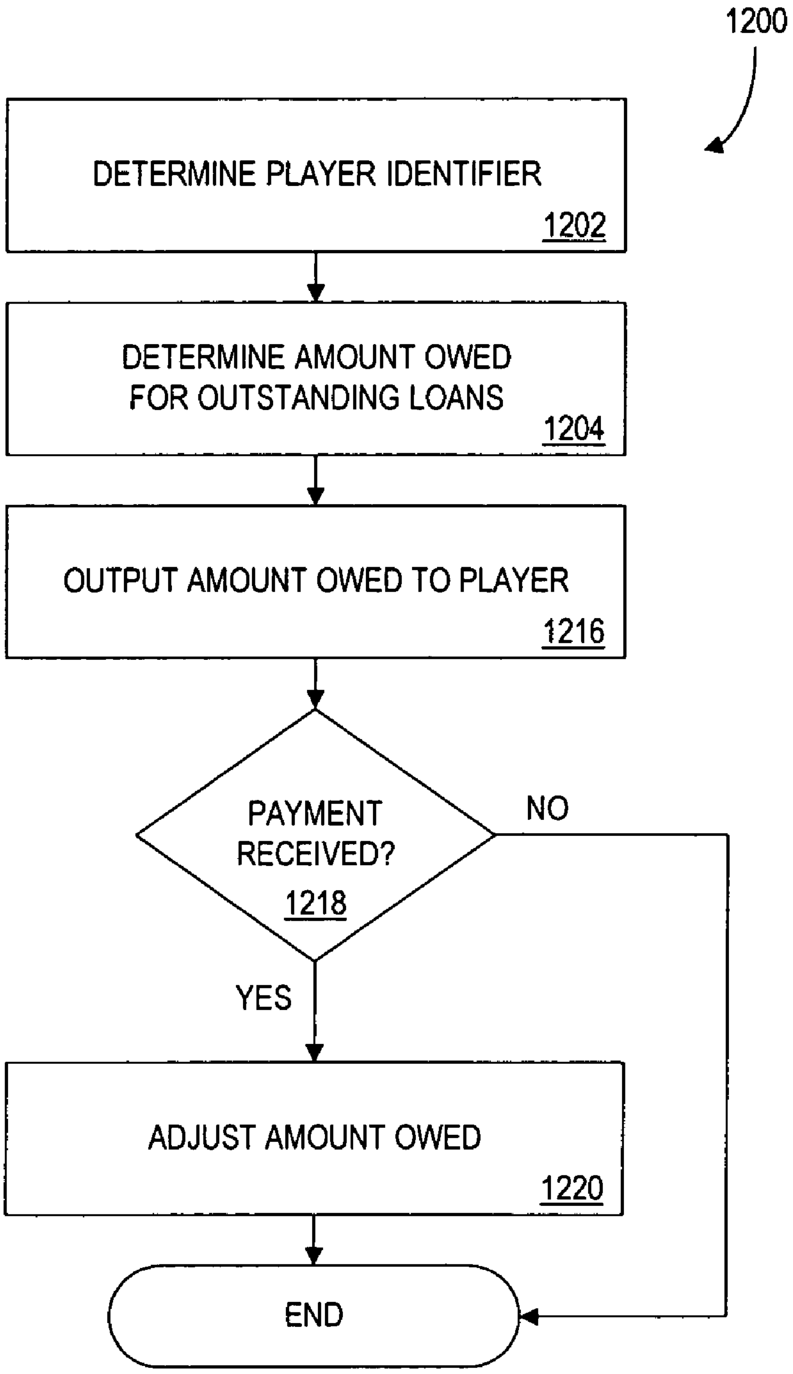
FIG. 12 is a flow diagram illustrating an exemplary process for outputting a reminder message to a player.

Referring now to FIG. 12, a flow diagram illustrates steps of a process 1200 for outputting a message reminding a player of an outstanding loan amount owed by the player. The process 1200 may be performed, for example, (i) by a gaming device 120, controller 110, peripheral device 160 and/or peripheral device controller 165 when a player inserts a player tracking card into a gaming device 120, (ii) by a terminal 130 when a player queries a terminal 130 for an amount of any outstanding loans associated with the player; (iii) by a casino employee (e.g., inside a casino cage) using a terminal 130 as a result of a player request; or (iv) by controller 110 or another computing device as a result of a player query, submitted via a user device (e.g., a home personal computer used by the player to remotely access information about the player's loans).

Process 1200 begins with step 1205, where a player identifier is determined. For example, a player identifier may be read from a player tracking card inserted by the player into a gaming device 120, terminal 130 or other device. Alternately, a player identifier may be typed in by the player or a casino employee using a keypad or touch-screen. In one or more embodiments (e.g., in embodiments where a player remotely checks status of outstanding loans from home or other location using, for example, a user device) receiving a player identifier may comprise receiving any information identifying a player. Such information may include, for example, a player name, social security number, contact information, a financial account identifier, or any other data capable of uniquely identifying the player. In one example, step 1205 may include receiving a loan identifier in addition to or in lieu of receiving a player identifier. The information identifying a player, including a player identifier, and/or the loan identifier may be received, e.g., via an input device 285 (FIG. 2).

Once the player is identified in step 1205, the process 1200 continues to step 1210, where the amount owed by the player for any outstanding loans associated with the player is determined. Step 1210 may comprise, for example, accessing the player database 325 and retrieving the record associated with the player (e.g., based on the information received in step 1205). For example, the embodiment 600 of player database 325 may be accessed and the payment amount owed 670 retrieved from the record associated with the player. In another example, step 1210 may comprise accessing the player database 325 as embodied in tabular representation 600 and determining all loan identifiers stored in field 680 of the record associated with the player. The loan database 345 may then be accessed and the loan identifiers retrieved from the player database used to identify records of all loans associated with the player. Assuming the loan database 345 is embodied as tabular representation 1000, the outstanding loan amounts 1035 for each loan associated with the player may be summed.

Once the amount owed by the player is determined, process 1200 continues to step 1215 in which an indication of the amount owed is output to the player. An indication of the amount owed may be output, for example, via a display screen, via a speaker, via a printer, or via any other output device. For example, a secondary display screen of a gaming device may display the following message to the player "You owe $15". In one or more embodiments (e.g., in embodiments where a casino employee operates a terminal 130 to determine the amount owed), an indication of the amount owed may be output by being printed on paper or another substrate. For example, the amount owed may be printed and output in the form of a bill to be provided to the player. In another example, outputting an indication of the amount owed may comprise outputting an indication of the amount owed to a casino employee (e.g., along with an instruction prompting the employee to speak the amount owed to the player).

If the player owes an amount for more than one loan, the details of each amount and the loan it pertains to may be output to the player. For example, the following message may be output to the player: "You owe $5 for the loan accepted Monday, May 15 at 8:14 pm and $10 for the loan accepted Tuesday, May 16 at 10:27 am, for a total of $15 owed".

In one or more embodiments, the player may be provided with an opportunity to provide payment for at least a portion of the amount owed at the time an indication of the amount owed is output to the player. For example, the player may be provided an opportunity to provide payment by inserting coins, bills, tokens or a credit card into a gaming device 120 or terminal 130 at which the indication of the amount owed is displayed to the player. In another example, the player may be provided an opportunity to provide authorization for at least a portion of the amount owed to be charged to a financial account associated with the player (e.g., a financial account identified in a player database). Accordingly, in such embodiments the process 1200 may continue to step 1220. In other embodiments, the process 1200 may end after step 1215. For example, while a gaming device may be operable to output an indication of the amount owed, the player may be required to visit a casino cage or booth to provide payment for the amount owed.

In step 1220 it is determined whether a payment for the amount owed has been received. For example, the gaming device 120 or terminal 130 at which an indication of the amount owed is output to the player may further output a query "Would you like to repay the loan at this time?" along with the indication of the amount owed. In one or more embodiments, a gaming device 120 or terminal 130 may include a "pay loan" button or area of a touch-screen that a player may actuate to indicate a desire to repay an amount owed (e.g., the actuation of such a button or area may, in some embodiments, trigger process 1200). Accordingly, a gaming device 120 and/or terminal 130 may be operable to receive a payment. For example, the gaming device 120 and/or terminal 130 may include a coin acceptor, bill acceptor, magnetic card acceptor or other mechanism for accepting payment.

In one or more embodiments, the player may be provided with a predetermined length of time after the output of the indication of the amount owed within which payment may be provided. For example, a player may be provided with one minute from the time the indication of the amount owed is output to provide payment for the amount owed.

Step 1220 may also comprise determining the amount of the payment that is received, if any.

If payment is received from the player in step 1220, the process 1200 continues to step 1225. Otherwise, the process 1200 ends. In one embodiment, an indication of the fact that the player was provided an opportunity to provide payment for the amount owed and failed to do so may be stored.

In step 1225 the amount owed determined in step 1210 is adjusted based on the amount of the payment received. For example, the payment amount owed 670 of tabular representation 600 may be decreased by the amount of the payment received in step 1220. In another example, an outstanding loan amount 1035 of the record associated with the player's loan in tabular representation 1000 may be decreased by the amount of the payment received in step 1220. It should be noted that, in embodiments where the player owes an amount for more than one loan and provides a payment that is less than the total of all amounts owed for all outstanding loans, the player may be prompted to identify the particular loan that the payment is being provided for. Once the amount owed by the player is adjusted to reflect the payment received in step 1220, the process 1200 ends.

In one or more embodiments, the process 1200 may further include a step of providing a receipt to the player. The receipt may indicate a transaction identifier and an indication of the amount of the payment provided, along with a time at which the payment was provided. This may be useful documentation to the player should any disputes arise as to whether/when the player repaid an amount owed.

It should be noted that, in one or more embodiments, a casino may forgive all or a portion of the amount owed by a player as a result of one or more loans accepted by the player. For example, a casino may forgive (e.g., per predetermined period of time) a maximum amount in loans or a maximum number of loans for a player that satisfies one or more predetermined criteria. Examples of such criteria include: (i) a rating of a player being at least a predetermined rating, (ii) an amount spent by the player at the casino or other facilities associated with the casino (e.g., casino hotel, casino gift shop, casino hotel) being at least a predetermined amount; (iii) an amount spent by another person associated with the player (e.g., a spouse of the player or a person sharing a room with the player) at the casino or other facilities associated with the casino being at least a predetermined amount; (iv) an amount wagered by the player (e.g., within a predetermined period of time) being at least a predetermined amount; (v) a frequency of the player's gambling at the casino or staying at a hotel associated with the casino being at least a predetermined frequency; and (vi) a history of the player's repayment of previous loans accepted by the player being sufficiently satisfactory.

E. Additional Embodiments

In one or more embodiments, an amount owed by a player as a result of a loan accepted by the player may be repaid by being automatically deducted from a player's winnings. For example, after a player accepts an offer for a loan and is provided with electronic credits in accordance with the loan, any payout won by the player on a gaming device may not be added to the credit meter balance of the gaming device. Instead, the payout may be applied against the amount owed by the player as a result of the loan until the loan is completely repaid. For example, assume a player is extended twenty credits on a $1 gaming device. Accordingly, each credit is equivalent to $1 and the player owes $20 as a result of accepting the loan. Further assume that as the player wagers the electronic credits provided via the loan, the player wins a first payout of ten credits. Rather than adding the ten credits to the credit meter balance, the gaming device may be programmed to apply the ten credits to the outstanding loan. Thus, the ten credits are equivalent to $10 and the $10 won by the player is used to repay a portion of the $20 owed by the player. After this payout, the player owes $10. Now assume the player wins a second payout of twenty credits. The twenty credits are equivalent to $20. The player still owes $10 for the loan. Accordingly, the gaming device may apply one-half of the second payout ($10) to repay the remainder of the loan and add the remaining $10 of the payout (i.e., ten credits) to the credit meter balance of the gaming device.

It should be noted that, in some embodiments, all loans are repaid in this manner and thus gaming devices operable to facilitate loans may be programmed to treat payouts in this manner whenever a player with an outstanding loan is playing the gaming device. For example, even if the player is not currently wagering with electronic credits received as a result of an accepted loan (i.e., the player is playing with the player's own money) but it is determined that the player owes an amount for a previously accepted loan, any payouts won by the player may be applied to repayment of the loan rather than being added to the credit meter balance of the gaming device. In this manner, a casino may be better assured of receiving repayment of a loan and a player need not worry about forgetting to repay a loan. In other embodiments, such a manner of repaying loans may be a term of some loans extended by a casino. For example, such a term may be included in a loan offered to a player that is not considered sufficiently risk worthy by the casino.

It should further be noted that, in some embodiments, a peripheral device associated with a gaming device may direct the gaming device to refrain from adding payouts to the credit meter balance and apply the withheld payout amount to repayment of the loan.

In another embodiment, payouts may be added to the credit meter balance of the gaming device but a player may not be allowed to cash out before providing payment for an outstanding loan. For example, a gaming device or peripheral device associated with a gaming device may determine, when a player actuates a cashout button of the gaming device, whether the player owes an amount for any loans accepted by the player. If the player does owe such an amount, the cashout routine may be interrupted (e.g., before any cash or cashless gaming receipt is provided to the player) and the player reminded of the amount owed. The player may then be provided with an opportunity to apply the amount in the credit meter balance to the amount owed and/or to provide payment in another form for the repayment of the loan. In one embodiment, the player may be provided with an option to indicate that the player would simply like to cash out at this time and defer repayment of the loan until a later time, thus re-activating the cash-out routine of the gaming device.

In one or more embodiments, a credit meter balance of a gaming device may be operable to track and output a negative number. Thus, for example, when a player is provided with electronic credits as a result of a loan accepted by the player, the credit meter balance may be set to a negative number indicating the number of electronic credits loaned to the player. Any payouts won by the player may then be added to the credit meter balance, reducing the negative number and eventually possibly resulting in the credit meter balance being a positive number, at which point the player may be allowed to cash out the credit meter balance.

In one embodiment, an amount owed as a result of a loan accepted by a player may be added to a hotel bill as a default method of payment. In other words, if the player does not pay off the amount owed for any outstanding loans before checking out of the hotel, the amount owed may be added to his hotel bill.

In one or more embodiments, issuance of a loan of electronic credits may be supervised by casino personnel. For example, after a player requests a loan, information about the player may be transmitted to a terminal operated by a casino employee. The employee may then decide whether or not to authorize the temporary credit, based on the information. In one embodiment, a video image of the player is also transmitted to the terminal, allowing the player to show potential sources of funds or collateral, such as table game chips, badly worn bills that cannot be read by the bill validator, checks, credit cards, etc.

In one or more embodiments, electronic credits loaned to a first player may be transferred to another player. For example, a husband and wife playing on the slot floor at the same time might get a single allocation of electronic credits to split between both of them. In another example, one player could be provided with a loan of electronic credits and transfer the electronic credits to another player.

In one or more embodiments, a loan of electronic credits may be partly or completely funded by third parties. For example, a long distance phone company may fund (e.g., guarantee) a loan of electronic credits for a player so long as the player agrees to talk with a sales representative of the long distance phone company. In another embodiment, the customer may receive a loan of electronic credits from the casino and may be obligated to talk with the phone company sales representative only if the debt is not repaid (in this embodiment the phone company may pay all or part of the amount of the unpaid debt to the casino).

In one or more embodiments, an offer for a loan of electronic credits or an addition of electronic credits to a credit meter balance of a gaming device may be initiated by casino personnel as they walked the casino floor. For example, a casino host could walk up to the gaming device of a player and enter a code that prompts the gaming device to output an offer for a loan and/or to add electronic credits to its credit meter balance.

In one or more embodiments, the electronic credits provided to a player as a result of a loan may expire over time. For example, if the electronic credits are not used by a predetermined time from the time at which they are provided to the player, the electronic credits may be automatically applied against the outstanding amount owed for the loan by the player.

In one or more embodiments, a customer may be charged a fee for a loan of electronic credits. For example, assuming a player who has a few electronic credits in a credit meter balance of a gaming device, the player may be offered a loan of electronic credits in exchange for the credits in the credit meter balance. Alternately, a player may be offered a loan of electronic credits in exchange for comp points previously earned by the player.

In one or more embodiments, payouts obtained by a player who has accepted a loan of electronic credits may be "taxed". For example, a portion (e.g., predetermined amount or percentage) of each payout may be withheld from the player. Such withheld portions of payouts may be added, for example, to an account available to repay debts of player who do not repay loans of electronic credits.

In one or more embodiments, a player may be offered a benefit at a time the player repays a loan. For example, Applicants have recognized that a player may feel less than enthusiastic about paying $20 or another amount to a casino to repay a loan. Thus, the player may feel better about the experience if he is provided with a benefit at the time of the repayment. For example, the player may be offered a ticket to a show at the casino, a discount to a show at the casino, a discount to a restaurant or shop affiliated with the casino, etc. Offering the player such a benefit may encourage loan repayment and may provide the casino an opportunity to advertise and encourage the player's patronization of events or merchants associated with the casino.

In one or more embodiments, a casino may forgive a player's debt to the casino in exchange for the player's commitment to an obligation. For example, the player's loan may be forgiven if the player agrees to purchase one or more entrees at a restaurant associated with the casino, attends a show affiliated with the casino, and/or commits to gambling at the casino at a predetermined time and/or for a predetermined duration.

In one or more embodiments, a player may be offered a credit card with a starting balance equal to or based on an amount owed by the player as a result of one or more loans accepted by the player. For example, a credit card issuer may be willing to pay the player's debt off to the casino in exchange for the customer's signing up for the credit card.

F. Conclusion

In conclusion, while the methods and apparatus of the present invention have been described in terms of particular embodiments, those skilled in the art will recognize that the present invention may be practiced with modification and alteration without departing from the teachings disclosed herein. For example, after reading the present disclosure one of ordinary skill in the art may recognize certain modifications that may be made to the methods and systems described herein. Such modifications are encompassed by the spirit and scope of the present invention.

What is claimed is:

1. A method of operating an electronic gaming device, said method comprising:

causing at least one processor to execute a plurality of instructions stored in at least one memory device to determine whether a player has inputted, to the electronic gaming device, one of at least one predetermined player input, wherein the at least one predetermined player input is not a particular content of an outcome of any game conducted on the electronic gaming device;

if the player has inputted one of the at least one predetermined player input to the electronic gaming device, in response to said player input, causing the at least one processor to execute the plurality of instructions to cause a first number of electronic credits to be added to a credit meter balance of the electronic gaming device, without a player of the electronic gaming device having first provided payment for the first number of electronic credits before the first number of electronic credits are added to the credit meter balance; and thereafter, causing the at least one processor to execute the plurality of instructions to deduct, in response to a cash-out request by the player, a designated quantity of electronic credits from the credit meter balance of the electronic gaming device, said designated quantity being at least one but no more than the first number of electronic credits previously added to the credit meter balance of the electronic gaming device, said deduction occurring prior to providing any cash-out credits to the player in response to the cash-out request, and said deduction occurring independent and distinct from any play of any game.

2. The method of claim 1, wherein one of the at least one predetermined player input is a placement of a wager amount that is greater than a current balance of electronic credits, the current balance of electronic credits comprising a balance of electronic credits in the credit meter balance before the addition of the first number of electronic credits.

3. The method of claim 1, wherein one of the at least one predetermined player input is an insertion of money into the electronic gaming device, wherein the first number of electronic credits are in addition to any credits provided to the player in exchange for the inserted money.

4. The method of claim 1, wherein one of the at least one predetermined player input is a placement of a wager which, if lost, will result in at least one of: (i) the credit meter balance being equal to zero, and (ii) the credit meter balance being less than a predetermined value.

5. The method of claim 1, wherein one of the at least one predetermined player input is an actuation of a cash out mechanism of the electronic gaming device.

6. The method of claim 1, wherein one of the at least one predetermined player input is a removal or attempted removal of a slot club player card from the electronic gaming device.

7. The method of claim 1, wherein one of the at least one predetermined player input is a placement of a wager having an amount that is at least equal to a predetermined amount.

8. The method of claim 7, wherein the amount wagered by the player comprises an accumulation of a plurality of amounts wagered by the player over a plurality of gaming sessions.

9. The method of claim 7, wherein the amount wagered by the player comprises an amount wagered by the player during a current gaming session.

10. The method of claim 1, which includes:

causing the at least one processor to execute the plurality of instructions to determine whether an offer for a loan of electronic credits should be output to the player by determining a score indicating the player's eligibility to receive electronic credits without providing payment therefore before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

11. The method of claim 10, which includes:

causing the at least one processor to execute the plurality of instructions to determine that the score indicating the player's eligibility to receive electronic credits without providing payment therefore is an acceptable score.

12. The method of claim 10, wherein determining the score comprises:

causing the at least one processor to execute the plurality of instructions to access data indicative of at least one of:

the player's past gaming activities, and the player's past re-payment for electronic credits received by the player without the player having provided payment therefore.

13. The method of claim 10, wherein determining the score comprises:

causing the at least one processor to execute the plurality of instructions to operate with a computing device to receive the score from the computing device.

14. The method of claim 10, which includes:

after causing the at least one processor to execute the plurality of instructions to determine whether an offer for a loan of electronic credits should be output to the player, if the at least one processor determines to offer the loan of electronic credits to the player, causing the at least one processor to execute the plurality of instructions to operate with at least one display device to display an offer for the addition of the first number of electronic credits.

15. The method of claim 14, which includes:

after causing the at least one processor to execute the plurality of instructions to operate with the at least one display device to display the offer for the addition of the first number of electronic credits, causing the at least one processor to operate with the at least one input device to receive, from the player, an indication of at least one of an acceptance and a rejection of the offer.

16. The method of claim 14, wherein the display device comprises a display device of a peripheral device associated with the electronic gaming device.

17. The method of claim 14, wherein the display device comprises a secondary screen of the electronic gaming device.

18. The method of claim 14, wherein causing the at least one processor to execute the plurality of instructions to operate with at least one display device to display an offer for the addition of the first number of electronic credits comprises:

causing the at least one processor to execute the plurality of instructions to operate with the at least one display device to display the offer via a player device associated with the player.

19. The method of claim 14, which includes causing the at least one processor to execute the plurality of instructions to cause audio information associated with the offer to be output via an audio device associated with the electronic gaming device.

20. The method of claim 1, which includes:

causing the at least one processor to execute the plurality of instructions to determine whether an offer for a loan of electronic credits should be output to the player by determining whether an amount wagered by the player during at least one of a predetermined number of game plays and a predetermined period of time satisfies a predetermined criterion for outputting the offer before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

21. The method of claim 1, which includes:

causing the at least one processor to execute the plurality of instructions to determine whether an offer for a loan of electronic credits should be output to the player by determining a credit history of the player before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

22. The method of claim 1, which includes:

causing the at least one processor to execute the plurality of instructions to determine whether an offer for a loan of electronic credits should be output to the player by determining an amount the player currently owes to a casino associated with the electronic gaming device before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

23. The method of claim 1, which includes:

causing the at least one processor to execute the plurality of instructions to determine whether an offer for a loan of electronic credits should be output to the player by determining whether valid information for contacting the player is available after the player leaves the electronic gaming device before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

24. The method of claim 1, which includes:

causing the at least one processor to execute the plurality of instructions to determine whether an offer for a loan of electronic credits should be output to the player by determining whether the player is a guest of a casino associated with the electronic gaming device before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

25. The method of claim 1, which includes:

causing the at least one processor to execute the plurality of instructions to determine whether an offer for a loan of electronic credits should be output to the player by determining data indicative of the player's past stays at a casino associated with the electronic gaming device before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

26. The method of claim 1, which includes:

causing the at least one processor to execute the plurality of instructions to determine whether an offer for a loan of electronic credits should be output to the player by determining whether a rating associated with the player qualifies the player to receive the offer before, if the player has inputted one of the at least one predetermined player input to the electronic gaming device, in response to said player input, causing the at least one processor to execute the plurality of instructions to cause the first number of electronic credits to be added to the credit meter balance of the electronic gaming device, wherein the rating is indicative of past gambling activity by the player.

27. The method of claim 1, which includes:

causing the at least one processor to execute the plurality of instructions to determine whether an offer for a loan of electronic credits should be output to the player by determining whether an amount of money spent by the player at a casino associated with the electronic gaming device is at least a predetermined amount before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

28. The method of claim 1, which includes:

causing the at least one processor to execute the plurality of instructions to determine whether an offer for a loan of electronic credits should be output to the player by determining a performance of a casino associated with the electronic gaming device before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

29. The method of claim 1, which includes:

causing the at least one processor to execute the plurality of instructions to determine whether an offer for a loan of electronic credits should be output to the player by determining whether the player has submitted an application to become eligible to receive the offer before, if the player has inputted one of the at least one predetermined player input to the electronic gaming device, in response to said player input, causing the at least one processor to execute the plurality of instructions to cause the first number of electronic credits to be added to the credit meter balance of the electronic gaming device.

30. The method of claim 1, which includes:

causing the at least one processor to execute the plurality of instructions to determine the first number of electronic credits to offer to the player.

31. The method of claim 30, wherein causing the at least one processor to execute the plurality of instructions to determine the first number of electronic credits to offer to the player comprises:

causing the at least one processor to execute the plurality of instructions to determine the first number of electronic credits to offer to the player based on information associated with at least one of the player, the electronic gaming device, and the casino associated with the electronic gaming device.

32. The method of claim 31, wherein the information associated with the player comprises a value of collateral provided by the player for the first number of electronic credits.

33. The method of claim 31, wherein the information associated with the player comprises a value of collateral provided by the player.

34. The method of claim 30, wherein causing the at least one processor to execute the plurality of instructions to determine the first number of electronic credits to offer to the player comprises:

causing the at least one processor to execute the plurality of instructions to determine a number of electronic credits that the player has accepted.

35. A method of operating an electronic gaming device, the method comprising:

causing at least one processor to execute a plurality of instructions stored in at least one memory device to determine whether a player has inputted, to the electronic gaming device, one of at least one predetermined player input, wherein the at least one predetermined player input is not a particular content of an outcome of any game conducted on the electronic gaming device;

if the player has inputted one of the at least one predetermined player input to the electronic gaming device, in response to said player input, causing the at least one processor to execute the plurality of instructions to cause at least one token to be output to the player of the electronic gaming device, the at least one token being representative of a first number of electronic credits to be added to a credit meter balance of the electronic gaming device, and the at least one token being provided to the player without the player first having provided payment therefore, in response to receiving the token from the player, causing the at least one processor to execute the plurality of instructions to add said first number electronic credits to the credit meter balance of the electronic gaming device; and thereafter, causing the at least one processor to execute the plurality of instructions to deduct, in response to a cash-out request by the player, a designated quantity of electronic credits from the credit meter balance of the electronic gaming device, said designated quantity being at least one but no more than the first number of electronic credits previously added to the credit meter balance of the electronic gaming device, said deduction occurring prior to providing any cash-out credits to the player in response to the cash-out request, and said deduction occurring independent and distinct from any play of any game.

36. The method of claim 35, wherein the at least one token comprises a cashless gaming receipt recognizable by at least one gaming device as being representative of the first number of electronic credits to be added to a credit meter balance of the at least one gaming device.

37. The method of claim 35, wherein the at least one token comprises at least one coin acceptable by at least one gaming device as payment in exchange for the first number of electronic credits.

38. The method of claim 35, wherein the at least one token comprises at least one casino token acceptable by at least one gaming device as payment in exchange for the first number of electronic credits.

39. A method of operating an electronic gaming device, the method comprising:

causing the at least one processor to execute a plurality of instructions stored in at least one memory device to conduct, at the electronic gaming device, a gaming session of a player;

causing the at least one processor to execute the plurality of instructions to determine whether the player is eligible to receive an offer for a number of electronic credits based on information associated with at least one of:

(i) the player, (ii) the electronic gaming device, and (iii) a casino associated with the electronic gaming device;

causing the at least one processor to execute the plurality of instructions to determine a first number of electronic credits to be included in the offer;

causing the at least one processor to execute the plurality of instructions to output the offer to the player in response to an event;

causing the at least one processor to execute the plurality of instructions to add the first number of electronic credits to a credit meter balance associated with the player, without requiring the player to first provide payment in exchange for the first number of electronic credits;

causing the at least one processor to execute the plurality of instructions to store an indication of the first number of electronic credits added to the credit meter balance associated with the player; and thereafter, causing the at least one processor to execute the plurality of instructions to deduct, in response to a cash-out request by the player, a designated quantity of electronic credits from the credit meter balance of the electronic gaming device, said designated quantity being at least one but no more than the first number of electronic credits previously added to the credit meter balance associated with the player, said deduction occurring prior to providing any cash-out credits to the player in response to the cash-out request, and said deduction occurring independent and distinct from any play of any game.

* * * * *

UNITED STATES PATENT AND TRADEMARK OFFICE

CERTIFICATE OF CORRECTION

PATENT NO. : 8,096,872 B2
APPLICATION NO. : 10/852388
DATED : January 17, 2012
INVENTOR(S) : Jay S. Walker et al.

It is certified that error appears in the above-identified patent and that said Letters Patent is hereby corrected as shown below:

IN THE CLAIMS:

In Claim 1, column 45, lines 38, replace “a” with --the--.

In Claim 14, column 46, line 60, replace “an” with --the--.

In Claim 14, column 46, line 61, replace “a” with --the--.

In Claim 18, column 47, line 17, after “with” add --the--.

In Claim 18, column 47, line 17, replace “an” with --the--.

In Claim 31, column 49, line 28, before “casino” replace “the” with --a--.

In Claim 35, column 49, line 62, before “token” add --at least one--.

In Claim 39, column 40, line 27, delete “the”.

Signed and Sealed this
Tenth Day of July, 2012

David J. Kappos
*Director of the United States Patent and Trademark Office*